US012112594B2

(12) United States Patent
Korenaga

(10) Patent No.: US 12,112,594 B2
(45) Date of Patent: Oct. 8, 2024

(54) DISK FEEDING DEVICE

(71) Applicant: ASAHI SEIKO CO., LTD., Tokyo (JP)

(72) Inventor: Tomokazu Korenaga, Saitama (JP)

(73) Assignee: ASAHI SEIKO CO., LTD., Tokyo (JP)

( * ) Notice: Subject to any disclaimer, the term of this patent is extended or adjusted under 35 U.S.C. 154(b) by 732 days.

(21) Appl. No.: 17/298,851

(22) PCT Filed: Sep. 5, 2019

(86) PCT No.: PCT/JP2019/034961
§ 371 (c)(1),
(2) Date: Jun. 1, 2021

(87) PCT Pub. No.: WO2020/115976
PCT Pub. Date: Jun. 11, 2020

(65) Prior Publication Data
US 2022/0036682 A1 Feb. 3, 2022

(30) Foreign Application Priority Data
Dec. 3, 2018 (JP) ................................ 2018-226414

(51) Int. Cl.
*G07D 3/12* (2006.01)
*G07D 1/00* (2006.01)
(Continued)

(52) U.S. Cl.
CPC ............... *G07D 3/128* (2013.01); *G07D 1/00* (2013.01); *G07D 3/14* (2013.01); *G07D 9/008* (2013.01); *G07D 2201/00* (2013.01)

(58) Field of Classification Search
CPC ...... G07D 1/00; G07D 2201/00; G07D 3/128; G07D 3/14; G07D 9/008; G07F 1/02; G07F 1/04
(Continued)

(56) References Cited

U.S. PATENT DOCUMENTS 2,846,769 A * 8/1958 Colont ..................... G01B 3/28 33/710
6,932,235 B2 * 8/2005 Abe ........................ G07F 17/32 221/206
(Continued)

FOREIGN PATENT DOCUMENTS

JP 3231110 11/2001
JP 2003-132389 5/2003
(Continued)

OTHER PUBLICATIONS

Official Communication issued in International Patent Application No. PCT/JP2019/034961, dated Oct. 15, 2019.
U.S. Appl. No. 17/299,154 to Umeda, filed Jun. 2, 2021.

*Primary Examiner* — Jeffrey A Shapiro
(74) *Attorney, Agent, or Firm* — GREENBLUM & BERNSTEIN, P.L.C.

(57) ABSTRACT

A holding unit that reciprocally holds a feeding roller and is separated from a base body, and locking position changing means (a first tooth row, a second tooth row, a shaft support portion, a cylindrical shaft, and the like) for changing a locking position of a holding unit with respect to the base body along a track in a direction in which a distance between the feeding roller and the guide roller is changed are provided. In the configuration, a position and an orientation of a guide roller are caused to be constant regardless of a size of a coin, and thus the coin is appropriately guided toward a feeding passage by the guide roller regardless of the size of the coin.

7 Claims, 19 Drawing Sheets

(51) Int. Cl.
*G07D 3/14* (2006.01)
*G07D 9/00* (2006.01)

(58) Field of Classification Search
USPC .................. 453/6, 10, 12, 13, 33–35, 49, 56
See application file for complete search history.

(56) References Cited

U.S. PATENT DOCUMENTS

| | | | | |
|---|---|---|---|---|
| 7,270,599 | B2 * | 9/2007 | Hu ......................... | G07D 9/008 453/18 |
| 7,341,508 | B2 * | 3/2008 | Rigo ........................ | G07D 1/00 453/18 |
| 2005/0227604 | A1 * | 10/2005 | Chang .................... | G07D 9/008 453/18 |
| 2010/0017017 | A1 * | 1/2010 | Adams ................... | G06Q 40/12 194/215 |

FOREIGN PATENT DOCUMENTS

| | | |
|---|---|---|
| JP | 2006-031164 | 2/2006 |
| JP | 2010-131122 | 6/2010 |
| JP | 2015-201063 | 11/2015 |
| JP | 2017-191505 | 10/2017 |

* cited by examiner

[FIG. 6]
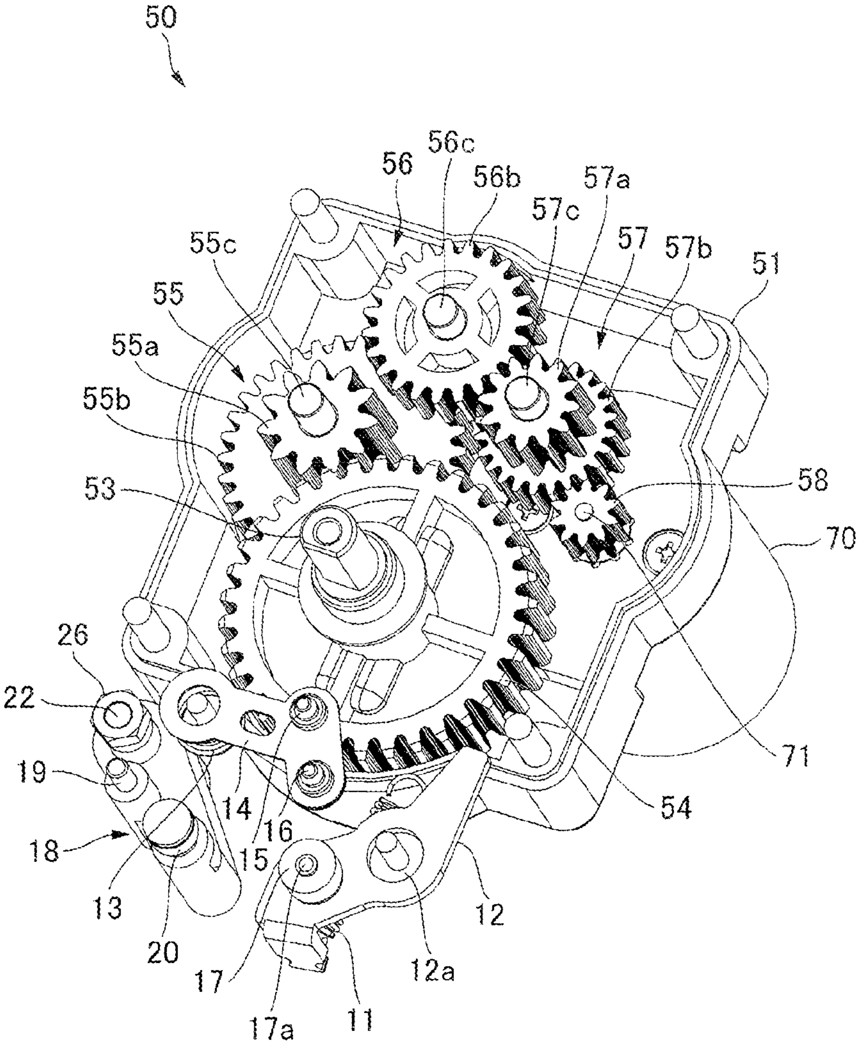

[FIG. 7]
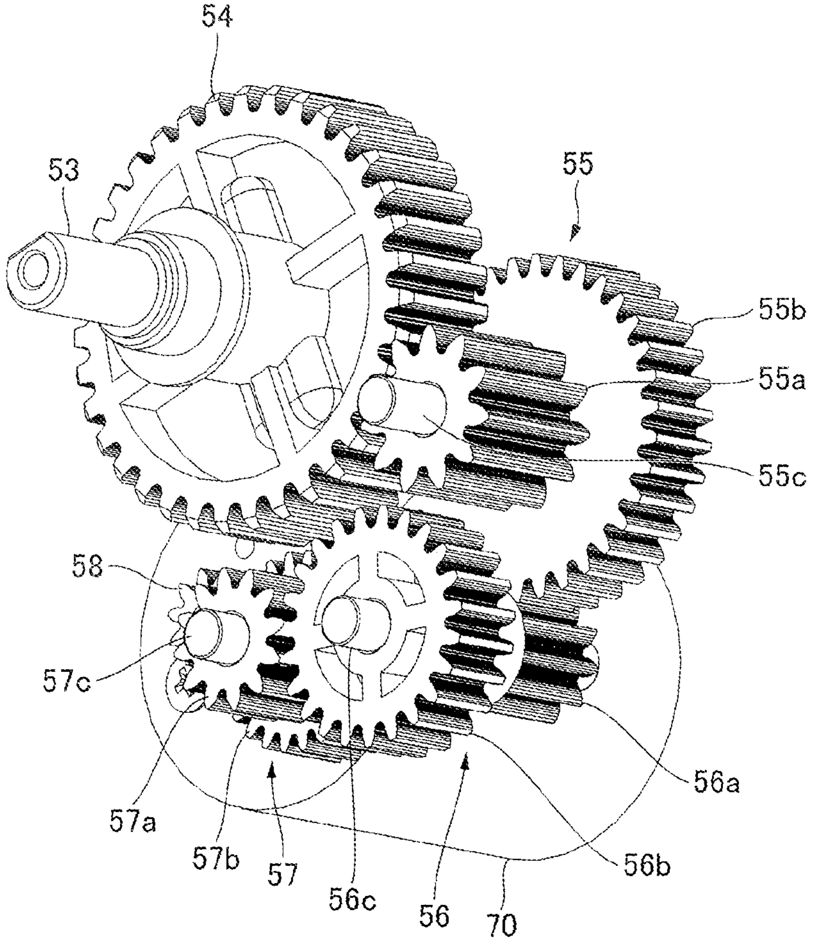

[FIG. 8 A]
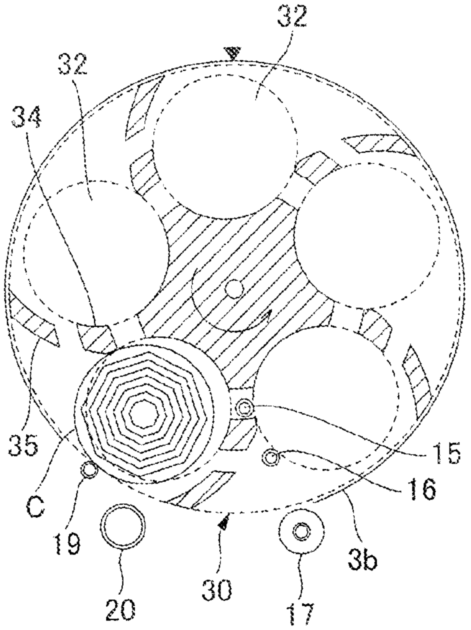
[FIG. 8 B]
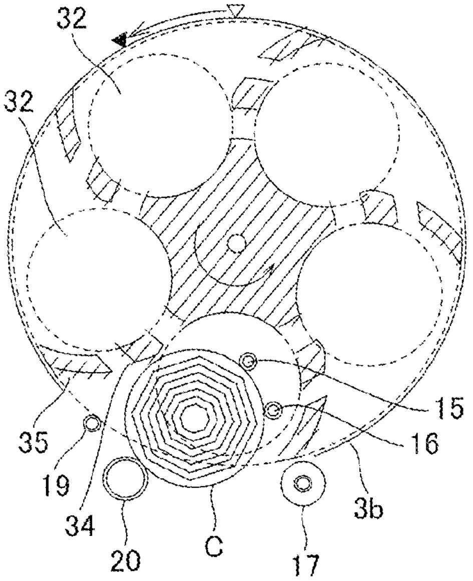

[FIG. 8 C]
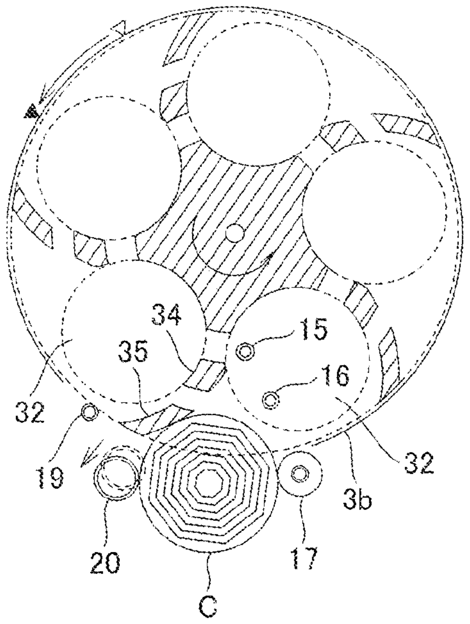
[FIG. 8 D]
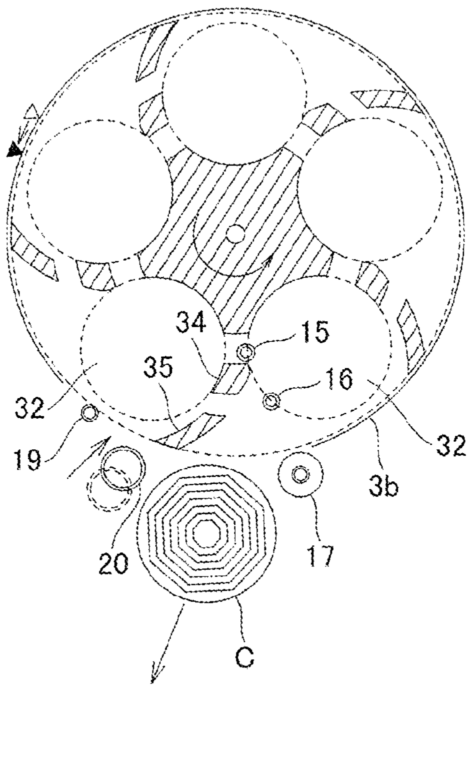

[FIG. 1 1]
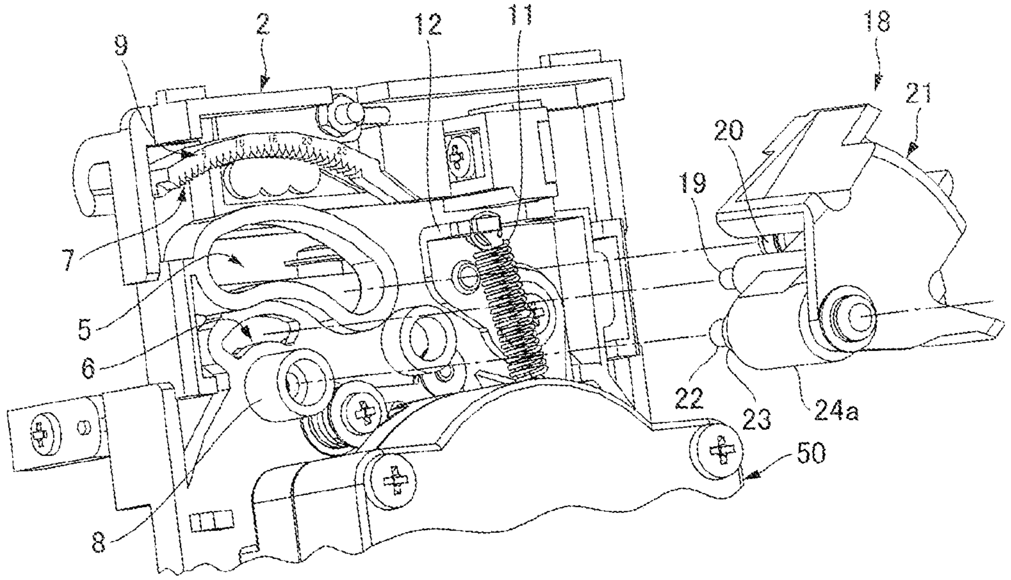
[FIG. 1 2]
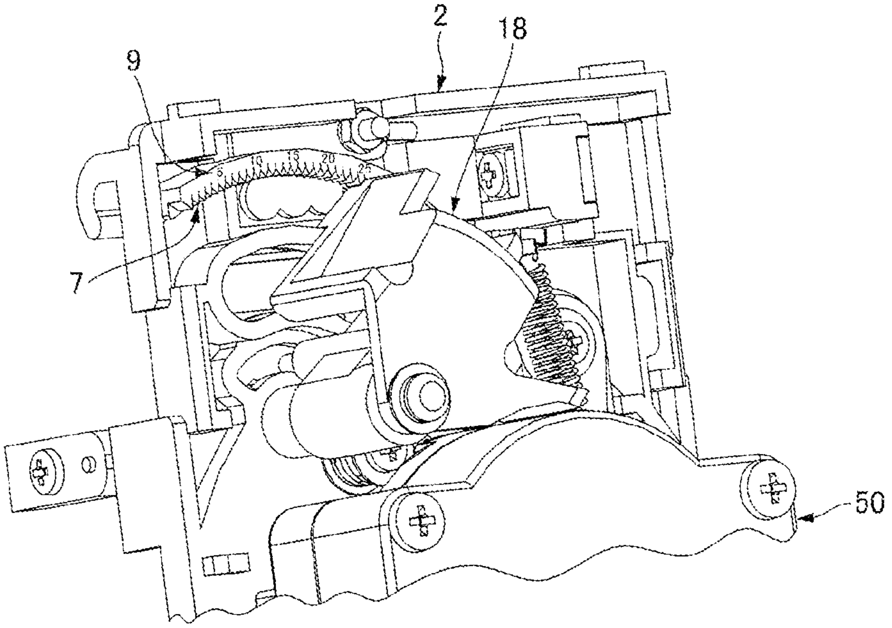

[FIG. 1 3]
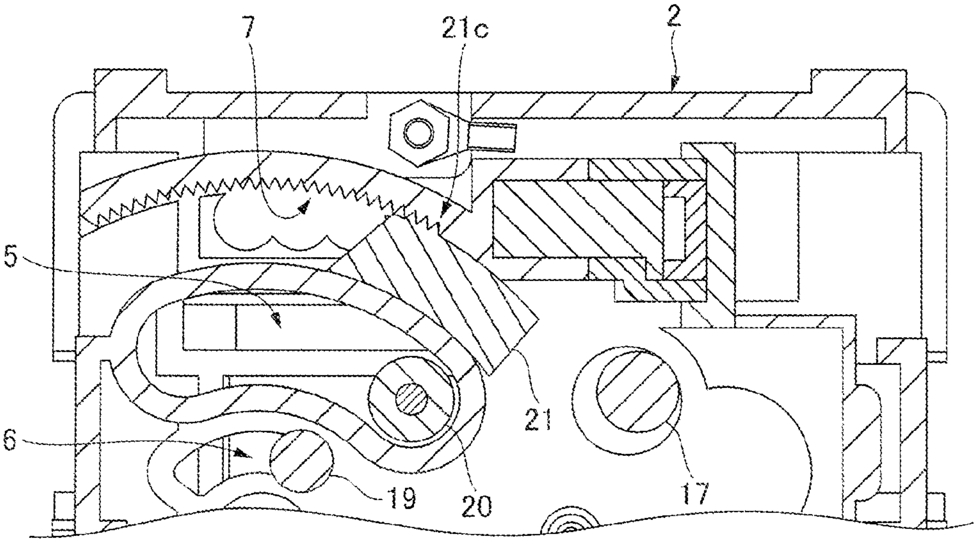

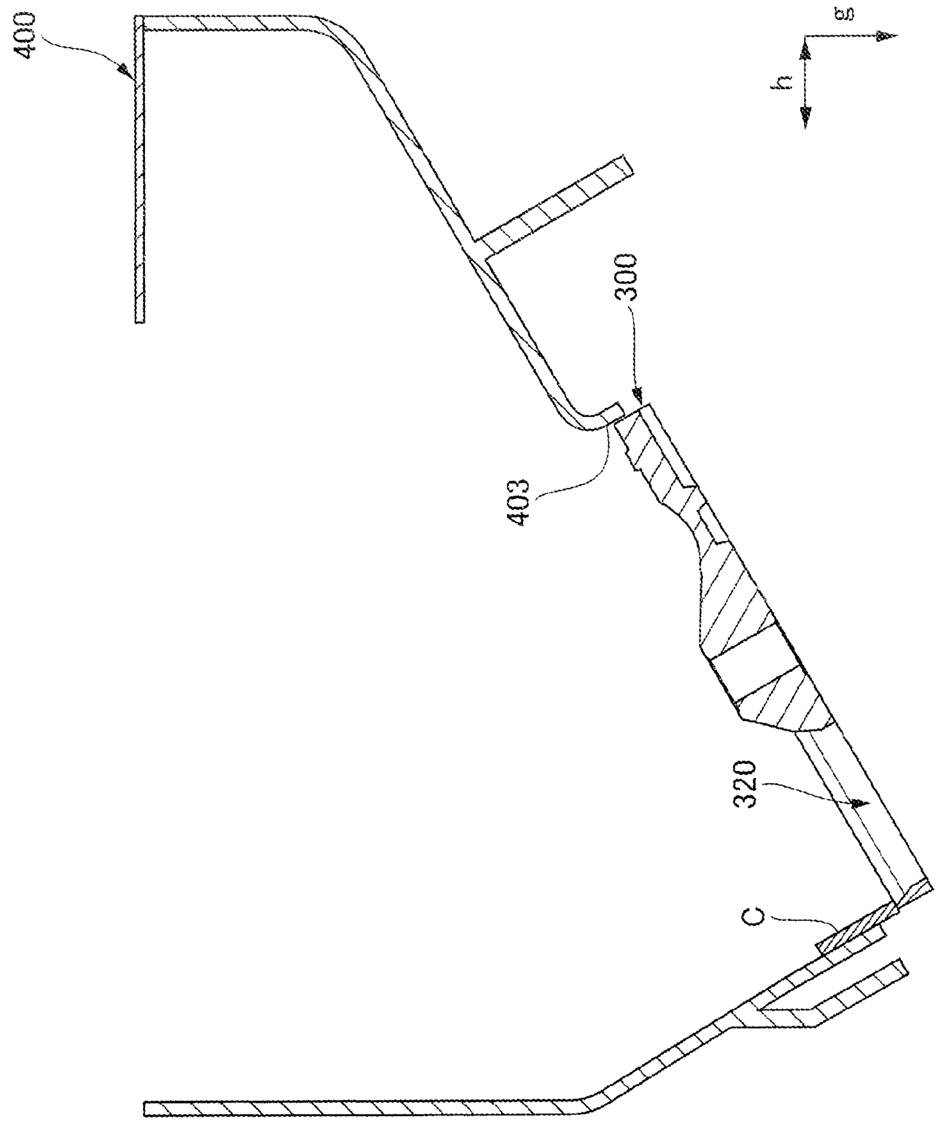
[FIG. 14]

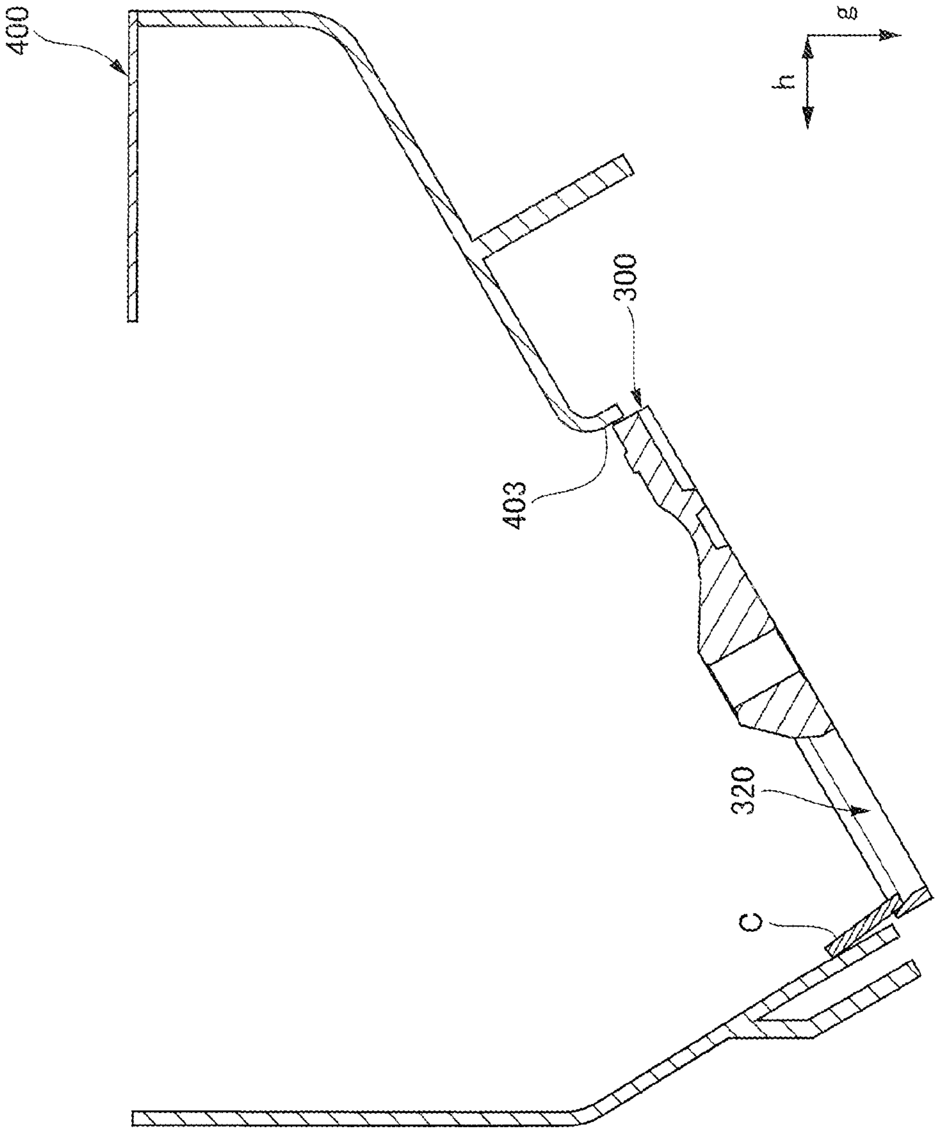
[FIG. 15]

[FIG. 1 6]
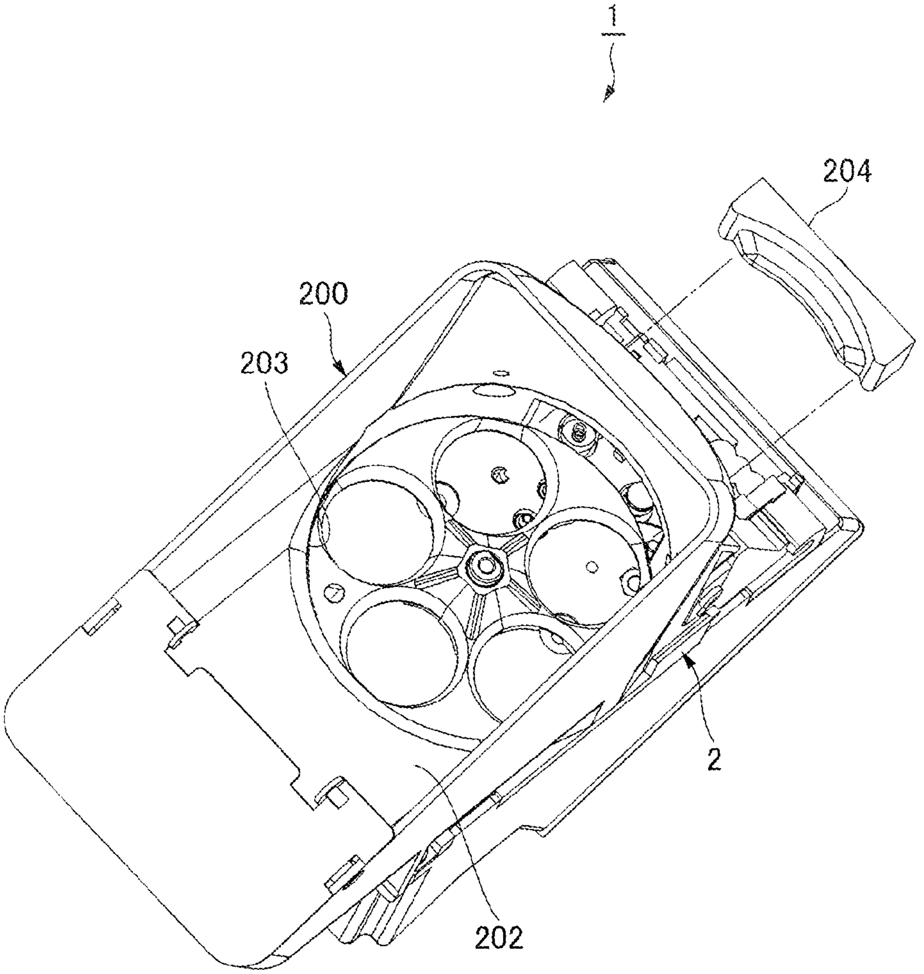

[FIG. 1 7]
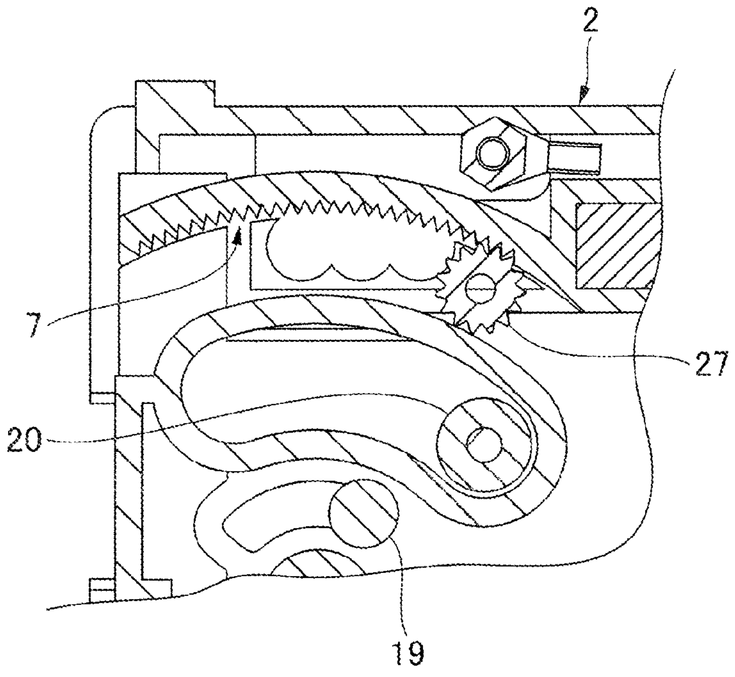

[Fig. 18]
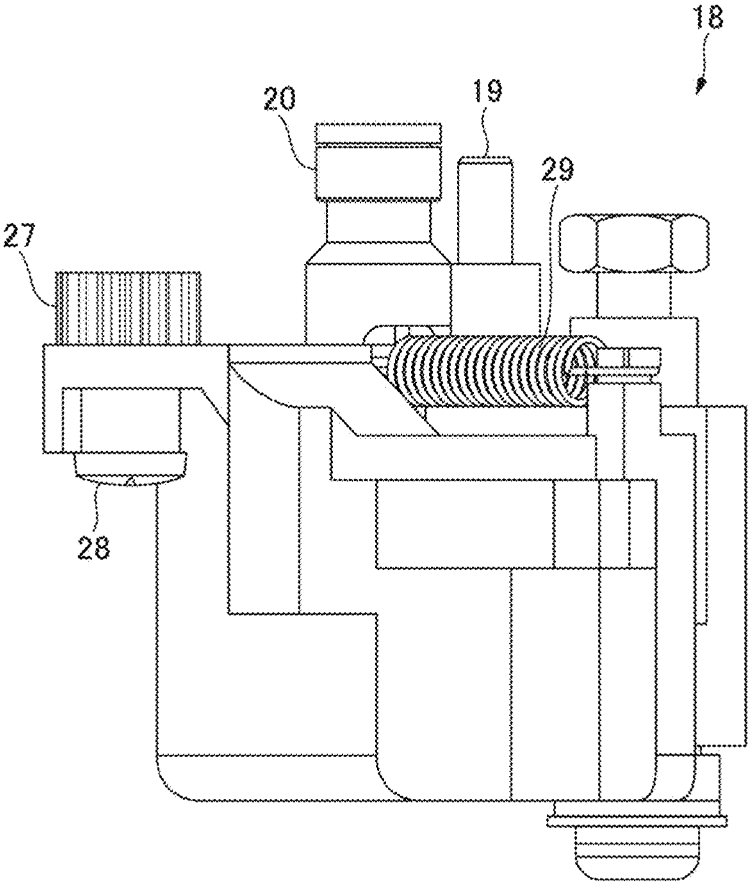

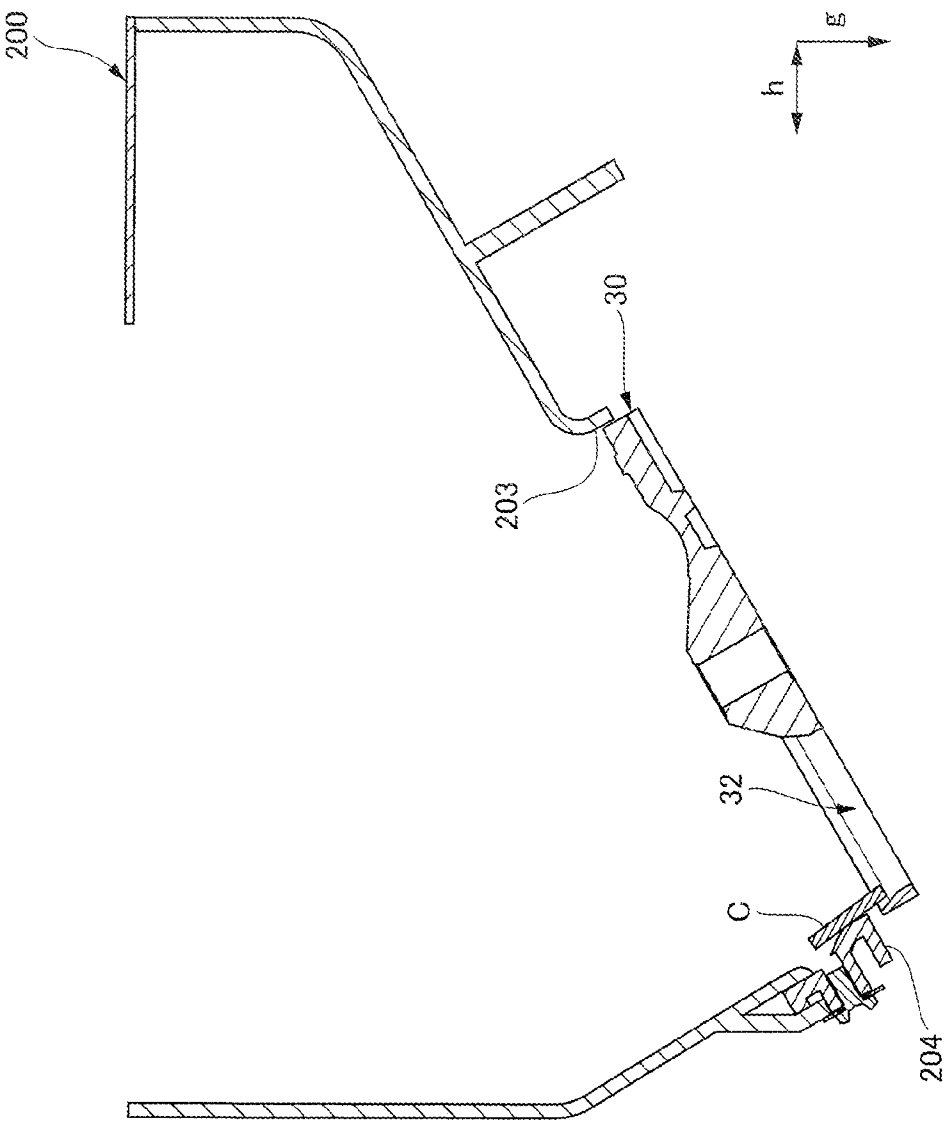
[FIG.1 9]

[FIG. 2 0]
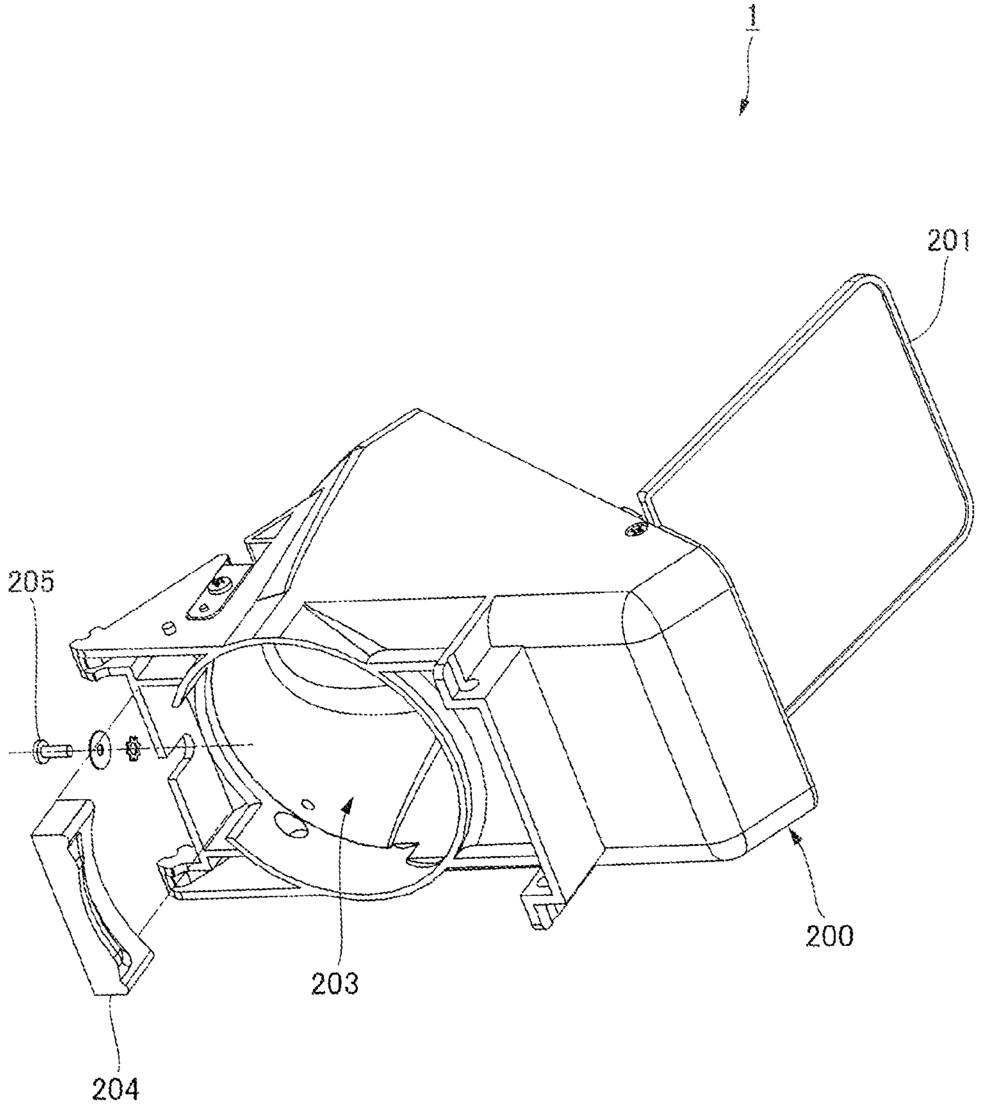

DISK FEEDING DEVICE

TECHNICAL FIELD

The present invention relates to a disk feeding device that feeds a disk such as a coin or a medal.

BACKGROUND ART

In the related art, there is known a disk feeding device including a base body, a storage portion that stores a disk, a rotatable rotary member, a feeding passage through which the disk fed toward an outside of the device passes, and a guide member and a feeding member that face each other via the feeding passage.

For example, a coin discharging device as a disk feeding device described in Patent Literature 1 includes a base body, a coin tank as a storage portion that stores a disk-like coin, a coin discharging disk plate as a rotary member, a guide plate as a guide member, and a coin feeding roller as a feeding member. The guide plate and the coin feeding roller face each other via a feeding passage provided on an upper surface of the base body. The rotatable coin discharging disk plate includes a circular coin catching hole penetrating in a thickness direction and a coin push-out fin, and after the coin sent from the coin tank is caught by the coin catching hole, the coin is dropped on the upper surface of the base body from the coin catching hole. The coin discharging disk plate pushes and moves the coin dropped on the upper surface of the base body in a rotation direction by the coin push-out fin protruding downward from a lower surface of the coin discharging disk plate. The guide plate comes into contact with the coin pushed by the coin push-out fin and guides the contacted coin toward the feeding passage at a position on the upstream side from the coin feeding roller in the rotation direction of the coin discharging disk plate. The coin feeding roller can reciprocate in a direction in which a distance from the guide plate is changed, and the coin feeding roller feeds the coin pinched between the coin feeding roller and the guide plate along the feeding passage by a biasing force of a spring while being biased toward the guide plate by the spring.

When changing a size of the coin to be set in the coin discharging device, a user needs to change a distance between the guide plate and the coin feeding roller in accordance with the size of the coin. In the coin discharging device described in Patent Literature 1, the user can change the distance between the guide plate and the coin feeding roller by changing an orientation of the guide plate with a rotation about an axis.

CITATION LIST

Patent Literature

Patent Literature 1: Japanese Patent No. 3231110

SUMMARY OF INVENTION

Technical Problem

However, in the coin discharging device described in Patent Literature 1, when the orientation of the guide plate is greatly changed, the coin moved to a predetermined position in the rotation direction of the coin discharging disk plate cannot be guided toward the feeding passage by the guide plate. Therefore, in the coin discharging device described in Patent Literature 1, there is a problem that the changeable range of the size of the coin is limited.

The present invention has been made in view of the above background, and an object of the present invention is to further expand a range in which a size of a disk can be changed.

Solution to Problem

According to a first aspect of the present invention, there is a disk feeding device including: a base body; a storage portion that stores a disk; a rotary member that is disposed in the base body and is rotatable; a feeding passage that is provided in the base body and through which the disk fed toward an outside of the device passes; and a guide member and a feeding member that face each other via the feeding passage, the rotary member including a circular through hole that penetrates in a rotation axis direction and a push portion that pushes the disk in a rotation direction to move the disk, and moving the disk that is sent to the rotary member from the storage portion and passes through the through hole with the push portion in the rotation direction, the guide member guiding the disk moved to a predetermined position of the rotation direction toward the feeding passage, the feeding member being capable of reciprocating in a direction in which a distance from the guide member is changed, and feeding the disk pinched between the feeding member and the guide member by a biasing force of a biasing member while being biased toward the guide member by the biasing member, the disk feeding device including: a holding body that reciprocally holds the feeding member and is separated from the base body; and locking position changing means for changing a locking position of the holding body with respect to the base body along a track in a direction in which the distance is changed.

Advantageous Effects of Invention

According to the present invention, there is an excellent effect that the changeable range of the size of the disk can be further expanded.

BRIEF DESCRIPTION OF DRAWINGS

FIG. 6 is a perspective view illustrating a drive unit of the coin hopper in a state in which an upper cover is removed when viewed from above.

FIG. 7 is a perspective view illustrating a gear train and a motor of the drive unit.

FIG. 8A is a plane cross-sectional view for explaining behavior of a coin with a rotation of a rotary disk of the coin hopper.

FIG. 8B is a plane cross-sectional view for explaining behavior of a coin with a rotation of the rotary disk, and illustrates a state in which the rotation of the rotary disk has progressed more than that in FIG. 8A.

FIG. 8C is a plane cross-sectional view for explaining behavior of a coin with a rotation of the rotary disk, and illustrates a state in which the rotation of the rotary disk has progressed more than that in FIG. 8B.

FIG. 8D is a plane cross-sectional view for explaining behavior of a coin with a rotation of the rotary disk, and illustrates a state in which the rotation of the rotary disk has progressed more than that in FIG. 8C.

FIG. 11 is an exploded perspective view illustrating one end portion of a base body of the coin hopper in a longitudinal direction when viewed from a lower surface side.

FIG. 12 is a perspective view illustrating one end portion of the base body in a longitudinal direction when viewed from a lower surface side.

FIG. 13 is a plane cross-sectional view illustrating one end portion of the base body in a longitudinal direction.

FIG. 14 is a cross-sectional view illustrating a hopper head and a rotary disk of a coin hopper of a first comparative example.

FIG. 15 is a cross-sectional view illustrating a hopper head and a rotary disk of a coin hopper of a second comparative example.

FIG. 16 is a perspective view illustrating a coin hopper according to an embodiment in a state in which a remaining prevention portion is removed from a hopper head.

FIG. 17 is a plane cross-sectional view illustrating a part of a base body of a coin hopper according to a modification example.

FIG. 18 is a perspective view illustrating a holding unit of the coin hopper.

FIG. 19 is a cross-sectional view illustrating a hopper head and a rotary disk of a coin hopper according to an embodiment.

FIG. 20 is a perspective view for explaining a state in which a remaining prevention portion is attached to the hopper head.

DESCRIPTION OF EMBODIMENTS

Hereinafter, as a disk feeding device to which the present invention is applied, an embodiment of a coin hopper that feeds a disk-like coin will be described. In the following drawings, scales, numbers, and the like in each structure may be different from those of an actual structure in order to facilitate understanding of each structure.

Figure 1:
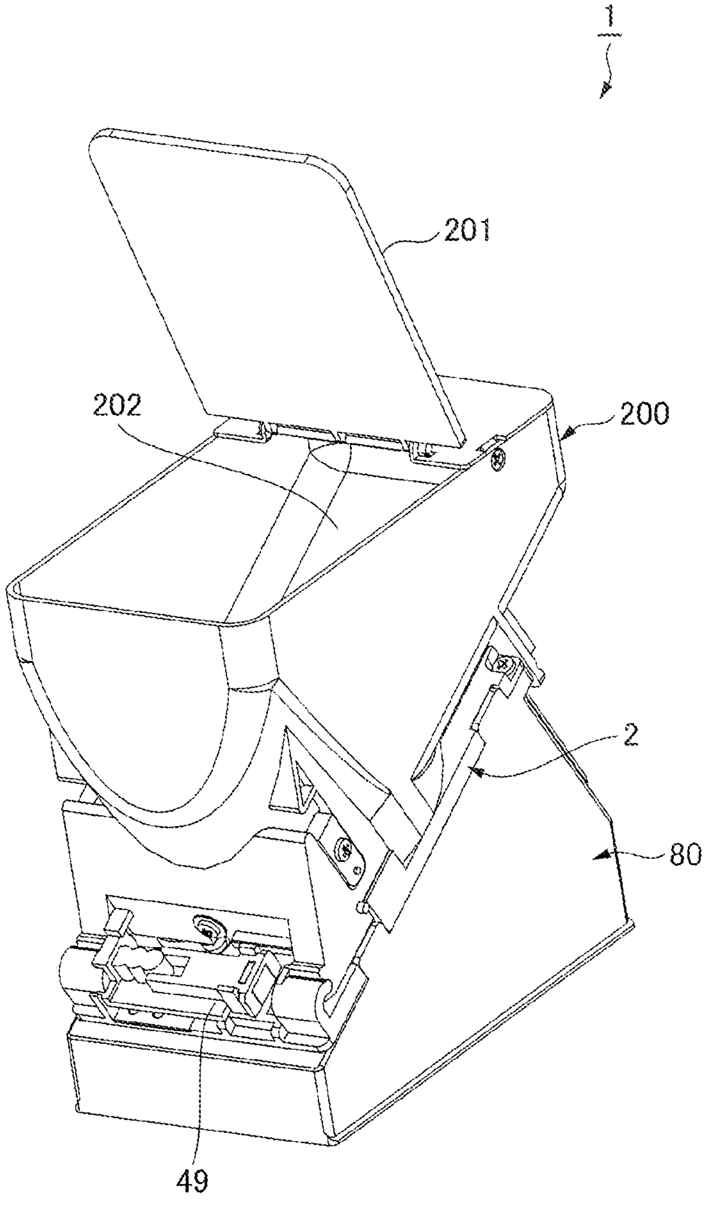
FIG. 1 is a perspective view of a coin hopper according to an embodiment.
Figure 2:
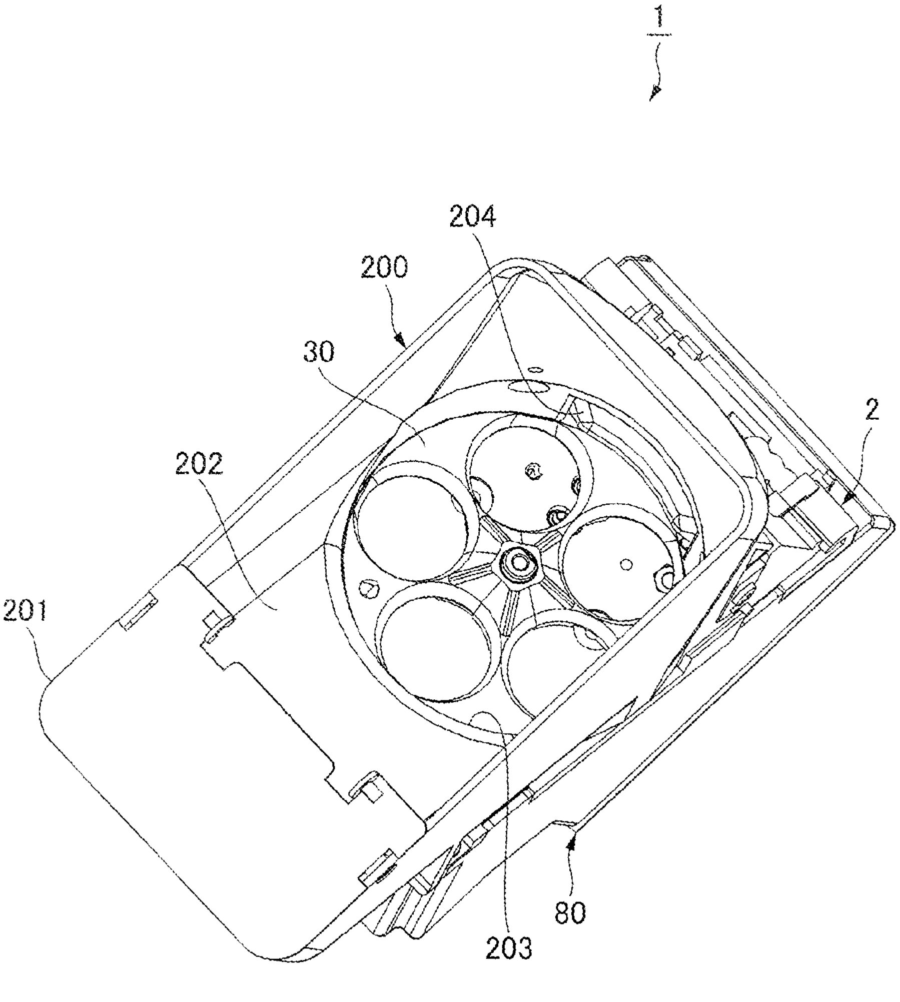
FIG. 2 is a perspective view illustrating the coin hopper when viewed from above.
Figure 3:
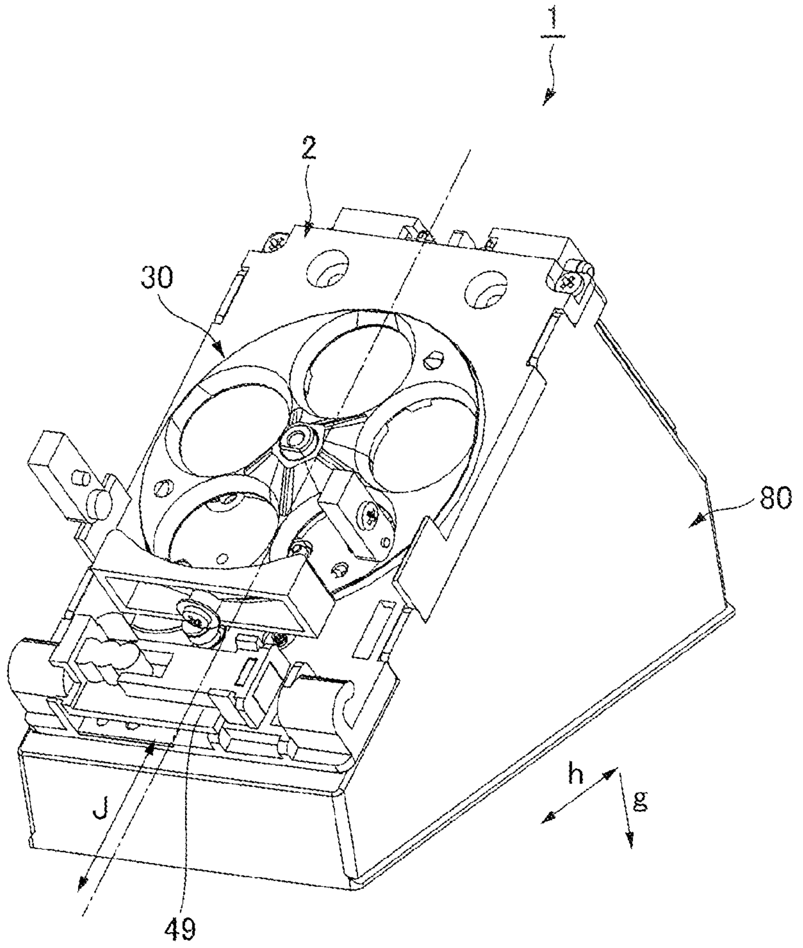
FIG. 3 is a perspective view illustrating the coin hopper in a state in which a hopper head is removed.

FIG. 1 is a perspective view of a coin hopper 1 according to the embodiment. FIG. 2 is a perspective view illustrating the coin hopper 1 when viewed from above. FIG. 3 is a perspective view illustrating the coin hopper 1 in a state in which a hopper head 200 as a storage portion is removed. The coin hopper 1 includes a base body 2, a hopper head 200, a rotary disk 30 as a rotary member, and a pedestal 80. The hopper head 200 attached to an upper surface of the base body 2 includes an upper cover 201 that is openable and closable. At a bottom portion of the hopper head 200, a taper 202 and a circular opening 203 connected to a lower end of the taper 202 are provided. The circular opening 203 faces the rotary disk 30 disposed on the base body 2 in a vertical direction.

Coins are stored in a bulk state in the hopper head 200, and some coins are stacked on the rotary disk 30 through the circular opening 203 described above. The coins placed on an upper surface of the rotary disk 30 are sorted one by one by a rotation of the rotary disk 30, and are fed from a feeding passage 49. Examples of the coins include money, scrip money such as a token, a medal used in a game machine, other pseudo money, and the like. A shape of a plane cross section of the disk set in the disk feeding device according to the present invention is not limited to a perfect circle. A flat body having an elliptical plane cross section, a flat body having a polygonal (for example, a heptagon or a dodecagon) plane cross section, and the like can also be a disk to be set in the disk feeding device according to the present invention.

The pedestal 80 covers a drive unit that is fixed to a lower surface of the base body 2 and that will be described later while supporting the base body 2 from below.

Figure 4:
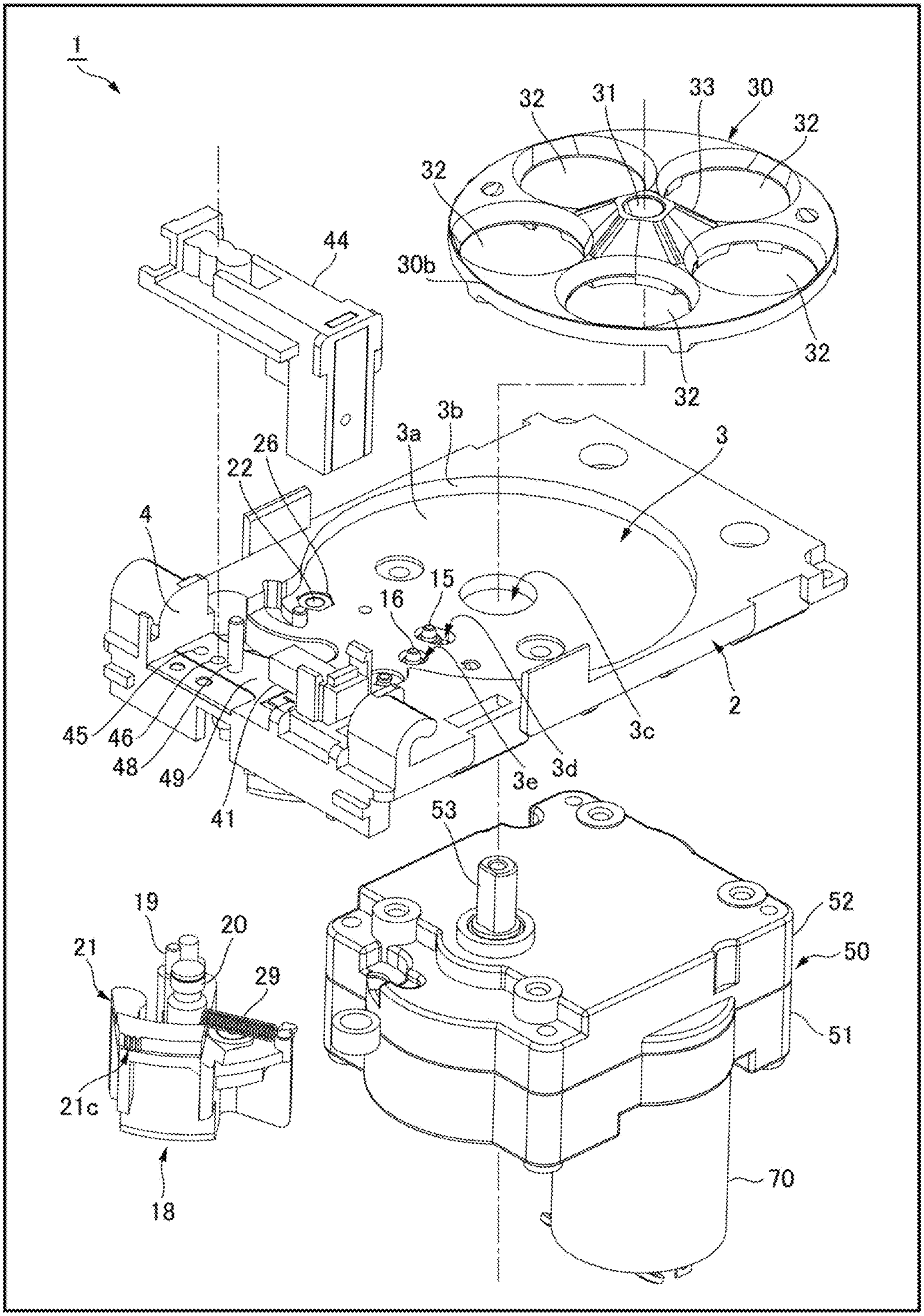
FIG. 4 is an exploded perspective view illustrating a part of the coin hopper when viewed from obliquely above.

FIG. 4 is an exploded perspective view illustrating a part of the coin hopper 1 when viewed from obliquely above. A circular recess 3 including a circular bottom surface 3*a* and a circumferential wall 3*b* rising from an outer edge of the bottom surface 3*a* is provided on an upper surface of the flat rectangular parallelepiped base body 2. On the bottom surface 3*a* of the circular recess 3, a third through hole 3*c* is provided at a center position of a circle, and a first through hole 3*d* and a second through hole 3*e* are provided at positions shifted from the center of the circle. A first regulation pin 15 passes through the first through hole 3*d* from the lower surface side of the base body 2 and protrudes upward from the bottom surface 3*a*. A second regulation pin 16 passes through the second through hole 3*e* from the lower surface side of the base body 2 and protrudes upward from the bottom surface 3*a*. A drive shaft 53 of a drive unit 50 passes through the third through hole 3*c* from the lower surface side of the base body 2.

The circumferential wall 3*b* of the circular recess 3 is not connected over the entire circumference, and includes an opening portion in a predetermined region in a circumferential direction. The circumferential wall 3*b* guides the movement of the coins in the circumferential direction (rotation direction of the rotary disk 30).

The disk-like rotary disk 30 is disposed in the circular recess 3 of the base body 2 and is rotated about the drive shaft 53. A counterclockwise direction in FIG. 4 is a normal rotation direction of the rotary disk 30, and a clockwise direction is a reverse rotation direction of the rotary disk 30. As the rotary disk 30 rotates in the normal rotation direction, the coins are fed one by one from a feeding passage 49 provided at one end portion of the upper surface of the base body 2 in a longitudinal direction.

Hereinafter, a radial direction of the circle centered on a rotation axis of the rotary disk 30 is simply referred to as a radial direction. In the radial direction, a side close to the rotation axis of the rotary disk 30 is referred to as an inner side. In the radial direction, a side away from the rotation axis of the rotary disk 30 is referred to as an outer side.

The rotary disk 30 includes a center hole 31 provided at a center, five coin catching holes 32 arranged in the rotation direction at positions on the outer side of the center hole 31 in the radial direction, and a conical central convex portion 33 provided on the upper surface so as to surround the center hole 31. The central convex portion 33 stirs the coins placed on the rotary disk 30.

The drive shaft 53 of the drive unit 50 passes through the center hole 31 to rotate the rotary disk 30. The coin catching holes 32 catch the coins placed on the rotary disk 30 in an orientation parallel to the bottom surface 3*a*. A circumferential wall surface of the coin catching holes 32 has a tapered shape expanding upward, and makes it easy to drop the coins into the coin catching holes 32.

An upper side of the feeding passage 49 is covered by a passage cover 44 fixed to the upper surface of the base body 2. Opposite sides of the feeding passage 49 are covered by the passage cover 44 and a passage wall 4 provided in the base body 2.

The drive unit 50 is fixed to a lower surface of the base body 2. A motor 70 is fixed to a lower surface of a lower cover 51 of the drive unit 50. A holding unit 18 is fixed to the lower surface of the base body 2 as well as the drive unit 50, and the holding unit 18 will be described in detail later.

A coin detection sensor 41 including a transmission type optical sensor is disposed at one end portion of the feeding passage 49 in a width direction. The coin detection sensor 41 includes a light receiving element disposed on a floor surface side of the feeding passage 49 and a light emitting element disposed on a top surface side, and detects the coins in the feeding passage 49 when an optical path from the light emitting element to the light receiving element is blocked by the coins.

A first recess 45, a second recess 46, and a third recess are provided at the other end portion of the feeding passage 49 in a width direction, and a lower end of a width adjustment pin 48 is inserted into any one of the three recesses. In FIG. 4, the lower end of the width adjustment pin 48 is inserted into the third recess. The width adjustment pin 48 is a member for adjusting the width of the feeding passage 49.

Although an example in which the circular recess 3 is provided on the upper surface of the base body 2 has been described, the circular recess 3 may be provided on a member fixed to the upper surface of the base body 2. A lower end portion of the hopper head 200 may function as a circular recess.

Figure 5:
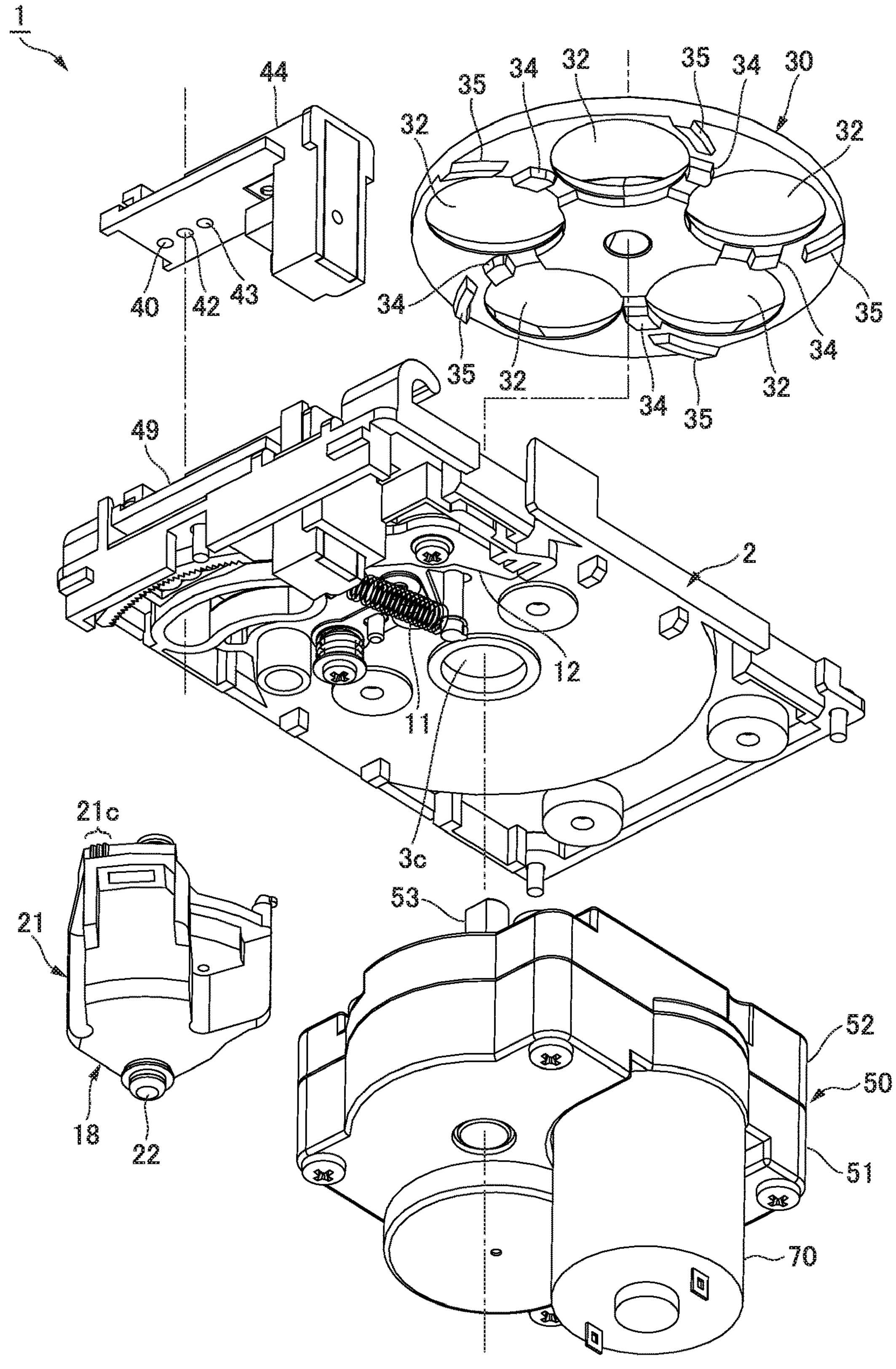
FIG. 5 is an exploded perspective view illustrating a part of the coin hopper when viewed from obliquely below.

FIG. 5 is an exploded perspective view illustrating a part of the coin hopper 1 when viewed from obliquely below. The passage cover 44 has a facing surface facing the feeding passage 49. A first recess 40, a second recess 42, and a third recess 43 are provided on the facing surface. An upper end of the width adjustment pin (48 in FIG. 4) is inserted into any one of the three recesses. The width adjustment pin 48 is fixed to the base body 2 in a state in which the lower end is inserted into the recess provided in the feeding passage 49 and the upper end is inserted into the recess provided in the passage cover 44.

On the lower surface of the rotary disk 30, a first push body 34 and a second push body 35 are provided in a vicinity of each of the five coin catching holes 32. The first push body 34 and the second push body 35 protrude downward from the lower surface of the rotary disk 30. The first push body 34 is positioned on an inner side from the second push body 35 in the radial direction. Each of the first push body 34 and the second push body 35 pushes the coins in the normal rotation direction with a side surface on a downstream side of the normal rotation direction. The side surfaces of the first push body 34 and the second push body 35 are positioned on an involute curve extending outward in the radial direction from the center of the rotary disk 30 in a plan view.

The coins caught by the coin catching holes 32 do not stay in the coin catching holes 32, pass through the coin catching holes 32, and fall to the bottom surface (3*a* in FIG. 4) of the circular recess 3 of the base body 2. In a thickness direction of the rotary disk 30, a clearance smaller than the thickness of a coin is formed between the lower surface of the rotary disk 30 and the upper surface of the coin dropped on the bottom surface 3*a*. More specifically, a protrusion amount of the first push body 34 and the second push body 35, which are directed downward from the lower surface of the rotary disk 30, is set to less than twice the thickness of the coin. Therefore, without passing through the coin catching hole 32 in a state in which two or more coins overlap each other, coins overlapping on the coins dropped on the bottom surface 3*a* of the circular recess 3 remain in the coin catching hole 32.

FIG. 6 is a perspective view illustrating the drive unit 50 in a state in which the upper cover (52 in FIG. 5) is removed when viewed from above. In FIG. 6, the holding unit 18 fixed to the base body 2 as well as the drive unit 50, the first regulation pin 15 and the second regulation pin 16 held by the base body 2, and the guide roller 17 held by the base body 2 are illustrated.

FIG. 7 is a perspective view illustrating a gear train and the motor 70 of the drive unit 50. As illustrated in FIGS. 6 and 7, a disk gear 54 that rotates together with the drive shaft 53 about the drive shaft 53 is fixed to the drive shaft 53 of the drive unit 50. In addition to the disk gear 54, the drive unit 50 includes a motor gear 58, a first intermediate gear 57, a second intermediate gear 56, and a third intermediate gear 55.

A motor shaft 71 of the motor 70 fixed to a lower surface of a lower cover 52 of the drive unit 50 passes through a bottom wall of the lower cover 52. In the lower cover 52, the motor gear 58 that rotates together with the motor shaft 71 about the motor shaft 71 is fixed to the motor shaft 71. The motor 70 is a DC motor that can rotate normally and reversely.

The first intermediate gear 57 includes a first small diameter gear 57*a*, a first large diameter gear 57*b*, and a first fixed shaft 57*c*. The first fixed shaft 57*c* is fixed to the bottom wall of the lower cover 52. The first small diameter gear 57*a* and the first large diameter gear 57*b*, which are made of the same member, have a through hole provided at a rotation center position. The first fixed shaft 57*c* passing through the through hole rotatably holds the first small diameter gear 57*a* and the first large diameter gear 57*b*. The first intermediate gear 57 causes the first large diameter gear 57*b* positioned on the lower side among the first small diameter gear 57*a* and the first large diameter gear 57*b* to mesh with the motor gear 58. The first intermediate gear 57 causes the first small diameter gear 57*a* positioned on the upper side to mesh with the second large diameter gear 56*b* of the second intermediate gear 56 to be described later. A rotation drive force of the motor gear 58 is transmitted to the first large diameter gear 57*b* and the first small diameter gear 57*a* at a meshing portion of the motor gear 58 and the first large diameter gear 57*b* of the first intermediate gear 57.

The second intermediate gear 56 includes a second small diameter gear 56*a*, the second large diameter gear 56*b*, and a second fixed shaft 56*c*. The second fixed shaft 56*c* is fixed to the bottom wall of the lower cover 52. The second small diameter gear 56*a* and the second large diameter gear 56*b*, which are made of the same member, have a through hole provided at a rotation center position. The second fixed shaft 56*c* passing through the through hole rotatably holds the second small diameter gear 56*a* and the second large diameter gear 56*b*. The second intermediate gear 56 causes the second large diameter gear 56*b* positioned on the upper side among the second small diameter gear 56*a* and the second large diameter gear 56*b* to mesh with the first small diameter gear 57*a* of the first intermediate gear 57. The second intermediate gear 56 causes the second small diameter gear 56*a* positioned on the lower side to mesh with a third large diameter gear 55*b* of the third intermediate gear 55 to be described later. A rotation drive force of the first small diameter gear 57*a* and the first large diameter gear 57*b* is transmitted to the second large diameter gear 56*b* and the second small diameter gear 56*a* at the meshing portion of the first small diameter gear 57*a* and the second large diameter gear 56*b*.

The third intermediate gear 55 includes a third small diameter gear 55*a*, the third large diameter gear 55*b*, and a third fixed shaft 55*c*. The third fixed shaft 55*c* is fixed to the bottom wall of the lower cover 52. The third small diameter gear 55*a* and the third large diameter gear 55*b*, which are made of the same member, have a through hole provided at a rotation center position. The third fixed shaft 55*c* passing through the through hole rotatably holds the third small diameter gear 55*a* and the third large diameter gear 55*b*. The third intermediate gear 55 causes the third large diameter gear 55*b* positioned on the lower side among the third small diameter gear 55*a* and the third large diameter gear 55*b* to mesh with the second small diameter gear 56*a* of the second intermediate gear 56. The third intermediate gear 55 causes the third small diameter gear 55*a* positioned on the upper side to mesh with the disk gear 54. A rotation drive force of the second small diameter gear 56*a* and the second large diameter gear 56*b* is transmitted to the third large diameter gear 55*b* and the third small diameter gear 55*a* at the meshing portion of the second small diameter gear 56*a* and the third large diameter gear 55*b*.

A rotation drive force of the third small diameter gear 55*a* and the third large diameter gear 55*b* is transmitted to the disk gear 54 and the drive shaft 53 at the meshing portion of the third small diameter gear 55*a* and the disk gear 54. A rotation drive force of the drive shaft 53 is transmitted to the rotary disk 30.

FIGS. 8A to 8D are plane cross-sectional views for explaining behavior of the coin with a rotation of the rotary disk 30. FIGS. 8A to 8D illustrate cross sections at positions of the first push body 34 and the second push body 35 in a thickness direction of the rotary disk 30 when viewed from above. FIGS. 8A to 8D illustrate a state in which a coin C is caught only in one of the five coin catching holes 32 for convenience, but actually, in most cases, coins C are caught in all the coin catching holes 32.

When the rotary disk 30 rotates normally (rotates in the counterclockwise direction in the drawing), the coins C placed on the rotary disk 30 are caught in the coin catching holes 32 while being stirred by a tapered circumferential wall surface around the coin catching holes 32 and the central convex portion 33. The coins C caught in the coin catching holes 32 pass through the coin catching holes 32, fall to the bottom surface (3*a* in FIG. 4) of the circular recess 3, and are pushed to be moved in the normal rotation direction by the first push body 34. At this time, the coins C are moved to the outer side in the radial direction by a centrifugal force without staying directly below the coin catching holes 32, and the side surface of the coins is brought into contact with the circumferential wall 3*b* of the circular recess 3 of the base body 2. The circumferential wall 3*b* guides the movement of the coins C in the rotation direction. A contact pressure of the side surface of the coins with respect to the circumferential wall 3*b* is caused by the centrifugal force in most cases, and thus does not apply a large force.

As illustrated in FIG. 8A, a coin C is moved to a position of an opening portion (hereinafter, referred to as a circumferential wall opening portion) in which a wall does not exist in the circumferential wall 3*b* while being pushed in the normal rotation direction by the first push body 34. At the position of the opening portion of the circumferential wall 3*b*, the coin C is moved outward in a radial direction by a centrifugal force from a circle having the same curvature as that of the circumferential wall 3*b*. In the vicinity of an end portion on the upstream side of the opening portion of the circumferential wall 3*b* in the normal rotation direction, a guide pin 19 is disposed in an orientation in which the axis of the guide pin 19 is parallel to the rotation axis of the rotary disk 30. The coin C moved to the position of an end portion on the upstream side of the circumferential wall opening portion in the normal rotation direction is brought into contact with the guide pin 19 and guided in the normal rotation direction.

A feeding roller 20 as a feeding member is disposed at a position on the downstream side from the guide pin 19 in the normal rotation direction. The guide roller 17 as a guide member is disposed at a position on the downstream side from the feeding roller 20 in the normal rotation direction. The feeding roller 20 and the guide roller 17 are positioned radially outside a circle having the same curvature as that of the circumferential wall 3*b*, and face each other via the feeding passage (49 in FIG. 4). After the state illustrated in FIG. 8A, the coin C further pushed in the normal rotation direction by the first push body 34 is separated from the guide pin 19, and partially protrudes outward from a circle having the same curvature as that of the circumferential wall 3*b* to come into contact with the feeding roller 20 as illustrated in FIG. 8B. At the same time, an edge of the coin C in the normal rotation direction abuts on the first regulation pin 15 and the second regulation pin 16. The first regulation pin 15 and the second regulation pin 16 regulate the movement of the coin C in the normal rotation direction, and guide the coin C outward in the radial direction.

After the state illustrated in FIG. 8B, the coin C further pushed by the first push body 34 further moves outward in the radial direction and is separated from the first push body 34 as illustrated in FIG. 8C. Then, the coin C is pushed by the second push body 35 positioned radially outside the first push body 34. In this state, since the movement of the coin C in the normal rotation direction is not regulated by the first regulation pin 15 and the second regulation pin 16, the coin C moves further in the normal rotation direction and is pinched between the guide roller 17 and the feeding roller 20.

The feeding roller 20 can perform a forward movement in a direction away from the guide roller 17 and a backward movement in a direction approaching the guide roller 17, and is biased in the backward movement direction by a spring. As the coin C pinched between the feeding roller 20 and the guide roller 17 moves outward in the radial direction, the feeding roller 20 moves forward in a direction away from the guide roller 17 as indicated by an arrow in FIG. 8C.

After the state illustrated in FIG. 8C, when the coin C pushed by the second push body 35 further moves outward in the radial direction, as indicated by a dotted line in FIG. 8D, the feeding roller 20 moves forward to a position in which a distance from the guide roller 17 is substantially equal to a diameter of the coin C. Immediately after this, the feeding roller 20 is forcefully moved backward by the biasing force of the spring, and returns to an original position. At this time, when the feeding roller 20 ejects the coin C, the coin C is fed outside the device along the feeding passage 49. When the coin C passes through the feeding passage 49, the coin C is detected by the coin detection sensor 41 illustrated in FIG. 4. When the coin C is detected, the coin detection sensor 41 transmits a coin detection signal to a control board.

The control board described above is provided outside the coin hopper 1, and counts the number of coins C based on a coin detection signal transmitted from the coin detection sensor 41. The control board turns on and off a power supplied to the motor 70, and reverses a polarity of a voltage at each of two power supply input terminals of the motor 70. This way, a normal rotation and a reverse rotation of the motor 70 are controlled.

When a situation occurs due to occurrence of a coin jam, in which the forward rotation of the motor 70 is locked and an excessive current flows to a coil of the motor 70 or the coin detection signal is not transmitted from the coin detection sensor 41, the control board executes jam removing processing. In the jam removing processing, the control board repeats a process of performing the reverse rotation and the normal rotation of the motor 70 a predetermined number of times for a predetermined time.

When the rotary disk 30 rotates in the reverse direction, it is necessary to release the regulation of the movement of the coin in the reverse rotation direction by the first regulation pin 15 and the second regulation pin 16. Therefore, the first regulation pin 15 and the second regulation pin 16 are configured to be retracted into the through holes (3*d* and 3*e*) provided on the bottom surface 3*a*.

Specifically, a tilting bracket 14 illustrated in FIG. 6 is cantilever-supported by the lower surface of the base body (2 in FIG. 4). This cantilever support is performed by a spring 13 pushing an end portion on the support side of the tilting bracket 14 toward the lower surface of the base body. The first regulation pin 15 and the second regulation pin 16 are fixed to a free end portion of the cantilever-supported tilting bracket 14. When the coin moving in the reverse rotation direction abuts on the first regulation pin 15 or the second regulation pin 16 and applies a downward force to the free end portion of the tilting bracket 14, a large force is applied to the spring 13 by the principle of the lever, and the spring 13 is deformed. In this deformation, the tilting bracket 14 is tilted in an orientation in which the free end portion of the tilting bracket 14 is moved downward, and protruding portions of the first regulation pin 15 and the second regulation pin 16 from the bottom surface (3*a* in FIG. 4) are retracted into the through hole (3*d* and 3*e* in FIG. 4).

The lower surface of the base body 2 holds a rotating bracket 12 illustrated in FIG. 6 in addition to the tilting bracket 14. The rotating bracket 12 can rotate within a range of a slight rotation angle about a shaft 12*a* provided substantially at the center in the longitudinal direction. One end portion of the rotating bracket 12 in the longitudinal direction is pulled by a spring 11. As a result of this pulling, the rotating bracket 12 is restricted at the position of the end in the clockwise direction in the drawing in the rotatable range centered on the shaft 12*a* in a state in which an external force is not applied from a member other than the spring 11. The guide roller 17 is fixed to one end portion of the rotating bracket 12 in the longitudinal direction so as to be rotatable about a rotation shaft 17*a*.

When the coin C illustrated in FIG. 8B is pushed by the first push body 34 to be moved outward in the radial direction, and collides with the guide roller 17 as illustrated in FIG. 8C, a large impact may be applied to the guide roller 17 and the coin C. The coin hopper 1 reduces the impact as follows. That is, when the coin C collides with the guide roller 17, the rotating bracket 12 illustrated in FIG. 6 slightly rotates in the counterclockwise direction in the drawing about the shaft 12*a*. Since the guide roller 17 moves in the movement direction of the coin C along with this rotation, the impact applied to the guide roller 17 and the coin C is suppressed.

When changing the size of the coin C to be set in the coin hopper 1, the user at least needs to replace the rotary disk 30 illustrated in FIG. 4, and change the distance between the feeding roller 20 and the guide roller 17 illustrated in FIG. 6. Specifically, it is necessary to provide the coin catching holes 32 having a diameter corresponding to the diameter of the coin C on the rotary disk 30, and use the rotary disk 30 provided with the first push body 34 and the second push body 35 which have a thickness corresponding to the thickness of the coin C. The distance between the feeding roller 20 and the guide roller 17 needs to be changed to a value corresponding to the diameter of the coin C.

In the coin hopper 1 according to the embodiment, the user can change the distance between the feeding roller 20 and the guide roller 17 in a wide range by changing a locking position of the holding unit 18 with respect to the base body 2. Hereinafter, the holding unit 18 will be described in detail.

Figure 9:
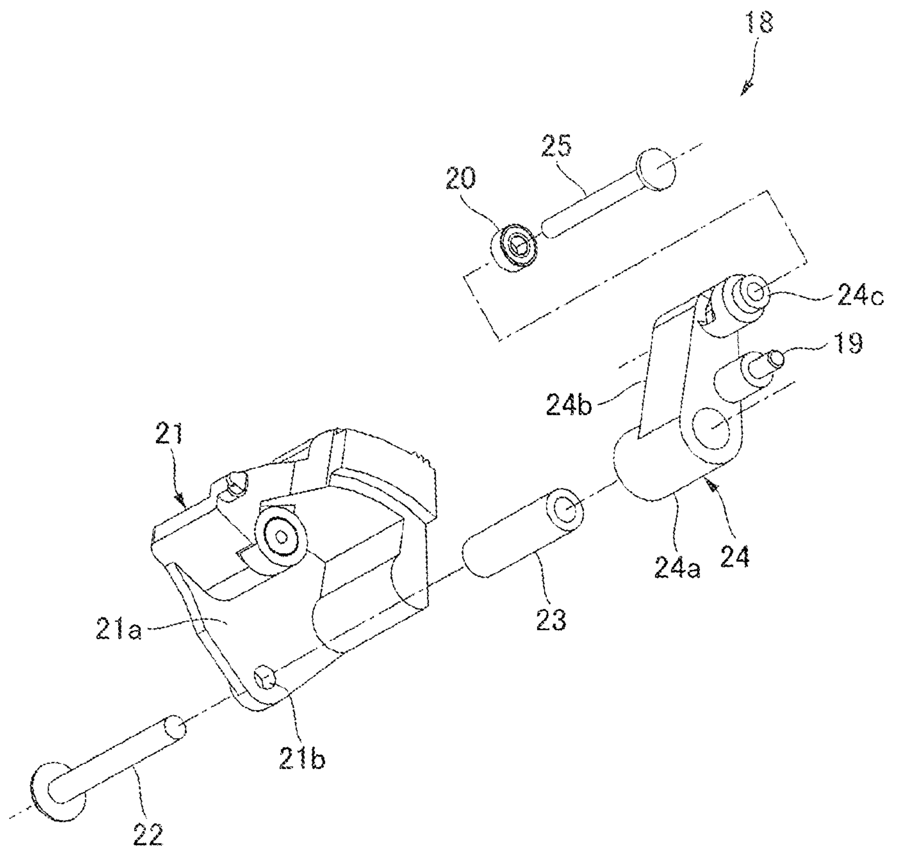
FIG. 9 is an exploded perspective view illustrating a holding unit of the coin hopper.

FIG. 9 is an exploded perspective view illustrating the holding unit 18. FIG. 9 illustrates the holding unit 18 when viewed from obliquely above. The holding unit 18 includes the guide pin 19, the feeding roller 20, a frame body 21, a male screw 22, a cylindrical shaft 23, a swing body 24, a shaft 25, and the like. A through hole 21*b* is provided on a bottom plate portion 21*a* of the frame body 21, and a screw portion of the male screw 22 is inserted into the through hole 21*b*. Furthermore, the screw portion of the male screw 22 is inserted into a hollow of the cylindrical shaft 23.

The swing body 24 includes a cylindrical portion 24*a* and a fin portion 24*b*. The cylindrical shaft 23 inserted into the hollow of the cylindrical portion 24*a* holds the swing body 24 so as to be swingable as a fixed shaft itself. The guide pin 19 described above is fixed to substantially the center of an upper surface of the fin portion 24*b* of the swing body 24 in the longitudinal direction.

As illustrated in FIG. 9, the feeding roller 20 described above has a flat cylindrical shape, and an outer circumferential surface of the feeding roller 20 can be rotated by a ball bearing. A through hole 24*c* is provided at one end portion of the fin portion 24*b* in the longitudinal direction. The shaft 25 is inserted into a hollow of the feeding roller 20 and the through hole 24*c* of the fin portion 24*b*. As a result, the feeding roller 20 is fixed to the swing body 24.

Figure 10:
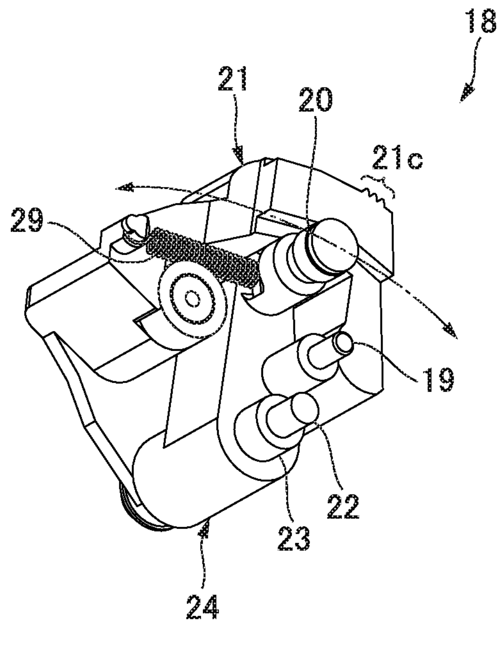
FIG. 10 is a perspective view illustrating the holding unit.

FIG. 10 is a perspective view illustrating the holding unit 18. The holding unit 18 reciprocates the guide pin 19 and the feeding roller 20 in an arrow direction of FIG. 10 by swinging the swing body 24 in the arrow direction of FIG. 10 with the cylindrical shaft 23 as an axis. The swing body 24 can swing in a range within the frame of the frame body 21. The swing body 24 is biased to one side in a swinging direction by a tensile force of a spring 29. Therefore, the swing body 24 is restricted by an end on one side of the swingable range in a state in which an external force is not applied from a member other than the spring 29. Hereinafter, the end on one side of the swingable range is referred to as a home position.

On an outer surface of the frame body 21 of the holding unit 18, a second tooth row 21*c* including three teeth is provided. A function of the second tooth row 21*c* will be described later.

A force of the spring 11 that pulls one end portion of the rotating bracket 12 illustrated in FIG. 6 in the longitudinal direction is larger than the force of the spring 29 that pulls the swing body 24 of the holding unit 18 illustrated in FIG. 10. Therefore, in FIG. 8C, when the coin C pinched between the feeding roller 20 and the guide roller 17 is pushed by the second push body 35 and moved outward in the radial direction, the feeding roller 20 moves in a direction in which the distance from the guide roller 17 increases. At this time, the guide roller 17 does not move in a direction in which the distance from the feeding roller 20 increases.

FIG. 11 is an exploded perspective view illustrating one end portion of the base body 2 in a longitudinal direction when viewed from a lower surface side. At one end portion of the base body 2 in the longitudinal direction, an arcuate first elongated hole 5, an arcuate second elongated hole 6, a first tooth row 7 including a plurality of teeth arranged at a predetermined interval along a circular arc track having a predetermined curvature, and a cylindrical shaft support portion 8 are provided. A scale 9 is attached to the first tooth row 7.

The holding unit 18 is mounted on the base body 2 in a state in which an upper end portion of the cylindrical shaft 23 is inserted into a hollow of the shaft support portion 8 of the base body 2. At this time, the guide pin 19 of the holding unit 18 is inserted into the second elongated hole 6 of the base body 2, and the feeding roller 20 of the holding unit 18 is inserted into the first elongated hole 5 of the base body 2. A tip end of the screw portion of the male screw 22 inserted into the hollow of the shaft support portion 8 is fastened to a nut 26 illustrated in FIG. 4. As illustrated in FIG. 12, this fastening causes the holding unit 18 to be fixed to the base body 2.

FIG. 13 is a plane cross-sectional view illustrating one end portion of the base body 2 in a longitudinal direction. FIG. 13 illustrates a plane cross section of a position of the first tooth row 7 in a thickness direction of the base body 2 when viewed from the lower surface side of the base body 2. In the base body 2 to which the holding unit 18 is fixed, the first tooth row 7 provided in the base body 2 and the second tooth row 21*c* provided in the frame body 21 of the holding unit 18 mesh with each other. A plurality of teeth of the first tooth row 7 are arranged along a circular arc track having a predetermined curvature. When the holding unit 18 is mounted on the base body 2, the user causes the second tooth row 21*c* provided in the frame body 21 of the holding unit 18 to mesh with three teeth which are at an arbitrary position in the first tooth row 7 while checking the scale (9 in FIG. 11) attached to the first tooth row 7. In such an operation, the user can change the locking position of the holding unit 18 with respect to the base body 2 along the circular arc track described above. When the locking position is changed, the distance between the feeding roller 20 at the home position in the holding unit 18 and the guide roller 17 changes.

In the coin hopper 1 having such a configuration, the position and orientation of the guide roller 17 are caused to be constant regardless of the size of the coin (distance between the feeding roller 20 and the guide roller 17), and thus the coin is appropriately guided toward the feeding passage by the guide roller 17 regardless of the size of the coin. Therefore, the changeable range of the size of the coin can be further expanded.

In the coin hopper 1 according to the embodiment, a combination of the first tooth row 7, the second tooth row 21*c*, the shaft support portion (8 in FIG. 11), the cylindrical shaft (23 in FIG. 11), the nut (26 in FIG. 4), and the like configures locking position changing means. The locking position changing means changes the locking position of the holding unit 18 with respect to the base body 2 along the track (circular arc track described above) for changing the distance between the feeding roller 20 and the guide roller 17.

A direction in which the cylindrical shaft 23 is inserted into and extracted from the hollow of the shaft support portion 8 is along a tooth width direction of the first tooth row 7 (direction orthogonal to a paper surface of FIG. 13). In such a configuration, the user can extract the cylindrical shaft 23 of the holding unit 18 from the shaft support portion 8 while releasing the meshing of the first tooth row 7 and the second tooth row 21*c*. The user can insert the cylindrical shaft 23 of the holding unit 18 into the shaft support portion 8 while meshing the second tooth row 21*c* with the teeth at an arbitrary position of the first tooth row 7. At this time, the user can set the distance between the feeding roller 20 and the guide roller 17 to an arbitrary value without using a dedicated jig by grasping the arbitrary position described above with the scale (9 in FIG. 12).

In a case in which the coin has a small size, when the coin is fed from the feeding passage 49, the coin passes by the side of the optical path without passing through an optical path of the coin detection sensor 41 illustrated in FIG. 4, and thus the coin may not be detected by the coin detection sensor 41. The coin hopper 1 according to the embodiment includes the width adjustment pin 48 that adjusts the width of the feeding passage 49, and the first recess 45, the second recess 46 and the third recess into which the width adjustment pin 48 is inserted. The user can easily and appropriately adjust the width of the feeding passage 49 by inserting the width adjustment pin 48 into the recess suitable for a diameter of the coin among the first recess 45, the second recess 46, and the third recess.

An arrow g in FIG. 3 indicates a gravity direction. An arrow h indicates a horizontal direction. As illustrated in FIG. 3, the coin hopper 1 is mounted on a coin processing apparatus such as a money changer in an orientation in which a bottom surface of the pedestal 80 is aligned in the horizontal direction h. The base body 2 is attached to the pedestal 80 in an orientation in which a longitudinal direction (direction indicated by an alternate long and short dash line in the drawing) of the base body 2 is inclined from the bottom surface of the pedestal 80. Therefore, in the coin processing apparatus, the orientation of the base body 2 is set in which the longitudinal direction is inclined from the horizontal direction h. In the coin hopper 1 according to the embodiment, the coin C is ejected obliquely downward from the inside of the coin hopper 1 as indicated by an arrow J in FIG. 3.

In general, in the coin hopper 1, the size of the base body 2 in the longitudinal direction is the largest among each of the parts. Therefore, in the coin processing apparatus, the orientation of the base body 2 is set in which the longitudinal direction is inclined from the horizontal direction h as described above, so that space saving of installation space of the coin hopper 1 in the horizontal direction h is achieved.

As illustrated in FIG. 4, in the coin hopper 1, a disk circumferential edge 30*b* which is a circumferential edge of the rotary disk 30 has a ring shape having a flat surface extending straight in the radial direction. The reason why the disk circumferential edge 30*b* has a flat surface extending straight in the radial direction is that a thickness capable of exhibiting a desired strength is required for a circumferential wall portion of the rotary disk 30.

FIG. 14 is a cross-sectional view illustrating a hopper head 400 and the rotary disk 300 of the coin hopper according to a first comparative example not including a certain aspect of the present invention. When the rotary disk 300 is made of a resin material, there is an advantage that a weight of the rotary disk 300 can be reduced, but there is a disadvantage that a width of the circumferential edge of the ring-shaped disk increases in order to ensure strength.

In the rotary disk 300, the reason why the increase in the width of the circumferential edge of the ring-shaped disk is disadvantageous is as follows. That is, when the coin hopper 1 is mounted on the coin processing apparatus in the orientation in which the longitudinal direction of the base body 2 is inclined from the horizontal direction h, as illustrated in FIG. 14, the orientation of the rotary disk 300 is set in which the radial direction is inclined from the horizontal direction h. Then, the coin C may remain on a circumferential wall surface of a circular opening 403 of the hopper head 400. Specifically, as illustrated in FIG. 14, the coin C may come into contact with a region positioned on the lowermost side in the gravity direction in the entire region of the circumferential wall surface of the circular opening 403 in an orientation facing the region. The coin C in such an orientation stays in the lowermost region on the circumferential wall surface of the circular opening 403 by the action of gravity while a side surface of the coin is rubbed against the edge of the ring-shaped disk without following the rotating rotary disk 300. Then, the control board erroneously detects that all of the coins C have been fed based on a fact that the coin detection signal has not been received from the coin detection sensor (41 in FIG. 4) for more than a certain period of time even though the normal rotation of the rotary disk 300 is continued. In the coin hopper that is required to accurately count the number of coins C, the erroneous detection is a great disadvantage.

FIG. 15 is a cross-sectional view illustrating the hopper head 400 and the rotary disk 300 of the coin hopper according to a second comparative example not including a certain aspect of the present invention. In the hopper head 400 according to the second comparative example, a lowermost region on the circumferential wall surface of the circular opening 403 extends to the immediate vicinity of the coin catching hole 32. In such a configuration, since the coin C coming into contact with the lowermost region on the circumferential wall surface of the circular opening 403 in an orientation facing the lowermost region can be guided to the coin catching hole 32 by the wall surface of the lowermost region, the occurrence of the erroneous detection described above can be suppressed.

However, the hopper head 400 according to the second comparative example has a disadvantage that an adaptable coin size is limited. Specifically, in the second comparative example, in order to prevent the coin C from spilling out of the hopper head 400 through a gap between the lowermost region on the circumferential wall surface of the circular opening 403 described above and an upper surface of the rotary disk 300, it is necessary to make the gap smaller than the thickness of the coin C. On the other hand, when the size of the coin C is changed, it is necessary to replace the rotary disk 300, but the thickness of the rotary disk 300 is not constant. This is because the thicknesses of the first push body and the second push body of the rotary disk 300 are set to values corresponding to the thickness of the coin C. When the rotary disk 300 has a relatively small thickness, the gap between the circumferential wall surface of the circular opening 403 of the hopper head 400 and the upper surface of the rotary disk 300 is larger than the thickness of the coin C, and the coin spills out of the hopper head 400. On the other hand, when the rotary disk 300 has a relatively large thickness, the circumferential wall surface of the circular opening 403 comes into contact with the upper surface of the rotary disk 300, and the hopper head 400 is inhibited from being attached to the base body (2 in FIG. 4). For the above reason, in the hopper head 400 according to the second comparative example, since the changeable range of the thickness of the rotary disk 300 is limited, the size of the coin C that can be adapted is limited.

In addition to the coin hopper of the first comparative example, the coin discharging device described in Patent Literature 1 also has a problem that the coin C may remain on the circumferential wall surface of the circular opening of the coin tank.

Therefore, an object of the present invention is to provide a disk feeding device capable of preventing a disk from remaining on a circumferential wall surface of a circular opening of a storage portion (hopper head 200 in the embodiment) such as a coin tank.

In order to achieve such an object, the present invention provides a disk feeding device including: a base body; a storage portion that stores a disk; a rotary member that is disposed in the base body and is rotatable; and a feeding passage that is provided in the base body and through which the disk fed toward an outside of the device passes, in which the rotary member includes a circular through hole that penetrates in a rotation axis direction and a push portion that pushes the disk in a rotation direction to move the disk, and moves the disk sent to the rotary member from the storage portion and passing through the through hole with the push portion in the rotation direction, the disk moved to a predetermined position of the rotation direction is fed outside the device from the feeding passage, and a remaining prevention portion that prevents the disk from remaining on an edge of the rotary member in a radial direction is detachably provided in the storage portion.

The coin hopper 1 according to the embodiment can achieve the above-described object. As illustrated in FIG. 2, the coin hopper 1 includes a remaining prevention portion 204 that prevents the coin from remaining in a region positioned on the lowermost side in the gravity direction in the entire region on the circumferential wall surface of the circular opening 203 of the hopper head 200. As illustrated in FIG. 19, the remaining prevention portion 204 protrudes inward in the radial direction from the circumferential wall surface of the circular opening 203 and comes into contact with the coin, thereby preventing the coin from standing on the circumferential edge of the rotary disk 30. As a result, the remaining prevention portion 204 prevents the coin from remaining in the lowermost region on the circumferential wall surface of the circular opening 203.

FIG. 16 is a perspective view illustrating the coin hopper 1 in a state in which the remaining prevention portion 204 is removed from the hopper head 200. As illustrated in the drawing, in the coin hopper 1 according to the embodiment, the remaining prevention portion 204 is configured to be detachable from the hopper head 200. Specifically, as illustrated in FIG. 20, the remaining prevention portion 204 inserted into the hopper head 200 from below is fixed to the hopper head 200 by a screw 205. By replacing the remaining prevention portion 204 with a remaining prevention portion having a shape and size suitable for the size of the coin, the size of the coin that can be set in the coin hopper 1 is easily changed. Therefore, in the hopper head 200 of the coin hopper 1 according to the embodiment, a range in which the size of the coin can be changed can be further expanded.

It is desirable that the remaining prevention portion 204 has a tapered surface descending from an outer side to an inner side in the radial direction of the circular opening 203.

Hereinafter, a modification example in which a partial configuration of the coin hopper 1 according to the embodiment is modified to another configuration will be described. The configuration of the coin hopper 1 according to the modification example is the same as that of the embodiment unless otherwise noted below.

FIG. 17 is a plane cross-sectional view illustrating a part of the base body 2 of the coin hopper according to a modification example. FIG. 17 illustrates a plane cross section of a position of the first tooth row 7 in a thickness direction of the base body 2 when viewed from the lower surface side of the base body 2. The coin hopper according to the modification example does not include the second tooth row, and instead of this, the coin hopper includes a gear 27 that meshes with the first tooth row 7. As illustrated in FIG. 18, the gear 27 is rotatably held by the holding unit 18. The holding unit 18 includes an operation unit 28 that is rotatable and mounted coaxially with the gear 27. A tool hole into which a tool such as a screwdriver is inserted is provided in the operation unit 28. The user can change the locking position of the holding unit 18 with respect to the base body 2 by operating the operation unit 28 with a tool to rotate the gear 27.

Although the preferred embodiments and modification examples of the present invention have been described above, the present invention is not limited to these embodiments and modification examples, and various modifications and changes can be made within the scope of the gist of the present invention. These embodiments and modification examples are included in the scope and the gist of the invention, and are also included in the invention described in the claims and the equivalent scope thereof.

The present invention has unique effects for each of the following aspects.

[First Aspect]

According to a first aspect, there is provided a disk feeding device (for example, a coin hopper 1) including: a base body (for example, a base body 2); a storage portion (for example, a hopper head 200) that stores a disk; a rotary member (for example, a rotary disk 30) that is disposed in the base body and is rotatable; a feeding passage (for example, a feeding passage 49) that is provided in the base body and through which the disk (for example, a coin C) fed toward an outside of the device passes; and a guide member (for example, a guide roller 17) and a feeding member (for example, a feeding roller 20) that face each other via the feeding passage, in which the rotary member includes a circular through hole (for example, a coin catching hole 32) that penetrates in a rotation axis direction and a push portion (for example, a first push body 34 and a second push body 35) that pushes the disk in a rotation direction to move the disk, and moves the disk sent to the rotary member from the storage portion and passing through the through hole with the push portion in the rotation direction, the guide member guides the disk moved to a predetermined position of the rotation direction toward the feeding passage, the feeding member is capable of reciprocating in a direction in which a distance from the guide member is changed, and feeds the disk pinched between the feeding member and the guide member by a biasing force of a biasing member while being biased toward the guide member by the biasing member, the disk feeding device including a holding body (for example, a holding unit 18) that reciprocally holds the feeding member and is separated from the base body, and locking position changing means (for example, a combination of a first tooth row 7, a second tooth row 21*c*, a shaft support portion 8, a cylindrical shaft 23, a nut 26, and the like) for changing a locking position of the holding body with respect to the base body along a track in a direction in which the distance is changed (track along a tooth arrangement direction of a first tooth row 7).

In the configuration, a position and an orientation of the guide member are caused to be constant regardless of the size of the disk set in the disk feeding device, and thus the disk is appropriately guided toward the feeding passage by the guide member regardless of the size of the disk. Therefore, according to the first aspect, the changeable range of the size of the disk can be further expanded.

[Second Aspect]

According to a second aspect, in the first aspect, a first tooth row (for example, a first tooth row 7) including a plurality of teeth arranged at a predetermined interval along the track is provided in the base body, a second tooth row (for example, a second tooth row 21*c*) that includes a plurality of teeth and meshes with the first tooth row is provided in the holding body, and the holding body is configured to be capable of being attached to and detached from the base body in a tooth width direction of the first tooth row.

In the configuration, the user can remove the holding body from the base body while releasing the meshing of the first tooth row provided in the base body and the second tooth row provided in the holding body. The user can mount the holding body on the base body while meshing the second tooth row provided in the holding body with the teeth at an arbitrary position of the first tooth row provided in the base body.

[Third Aspect]

According to a third aspect, in the first aspect, a tooth row including a plurality of teeth arranged at a predetermined interval along the track is provided in the base body, a gear meshing with the tooth row is provided in the holding body, and the locking position changing means includes at least the tooth row and the gear.

In the configuration, the user can adjust the distance between the feeding member and the guide member with a simple operation of turning the gear.

[Fourth Aspect]

According to a fourth aspect, in the second aspect or the third aspect, in the disk feeding device, a scale is provided on the first tooth row or the tooth row.

In the configuration, the user can set the distance between the feeding member and the guide member to an arbitrary value without using a dedicated jig by grasping a target attachment position of the holding body in the base body by using the scale.

[Fifth Aspect]

According to a fifth aspect, in any one of the first aspect to the fourth aspect, a detection sensor (for example, a coin detection sensor 41) that detects the disk in the feeding passage, a width adjustment member (for example, a width adjustment pin 48) that adjusts a width of the feeding passage, and a plurality of recesses (for example, a first recess 45, a second recess 46, and a third recess) into which the width adjustment member is inserted are provided in the feeding passage.

In the configuration, the user can easily and appropriately adjust the width of the feeding passage by inserting the width adjustment member into the recess suitable for the diameter of the disk among a plurality of the recesses provided in the feeding passage, and thus can suppress occurrence of a failure that the disk is not detected by the detection sensor.

[Sixth Aspect]

According to a sixth aspect, in any one of the first aspect to the fifth aspect, a remaining prevention portion (for example, a remaining prevention portion 204) that prevents the disk from remaining on an edge of the rotary member in a radial direction is detachably provided in the storage portion.

In the configuration, the user can easily change the size of the disk that can be set in the disk feeding device by replacing the remaining prevention portion that is attached to the storage portion. Therefore, since a manufacturer of the disk feeding device is not required to individually manufacture the storage portion corresponding to each size and it is only necessary to manufacture the remaining prevention portion corresponding to each size at a lower cost than that of the storage portion, the cost can be reduced.

INDUSTRIAL APPLICABILITY

The present invention can be suitably used for, for example, a disk feeding device and a disk processing device including the disk feeding device.

This application claims priority based on Japanese Patent Application No. 2018-226414 filed on Dec. 3, 2018, the entire contents of which are incorporated herein by reference.

REFERENCE SIGNS LIST

1 coin hopper (disk feeding device)
2 base body
7 first tooth row
8 shaft support portion
9 scale
17 guide roller (guide member)
18 holding unit (holding body)
20 feeding roller (feeding member)
21*c* second tooth row
23 cylindrical shaft
26 nut
27 gear
30 rotary disk (rotary member)
32 coin catching hole (through hole)
34 first push body (push portion)
35 second push body (push portion)
41 coin detection sensor (detection sensor)
45 first recess
46 second recess
48 width adjustment pin (width adjustment member)
49 feeding passage
200 hopper head (storage portion)
204 remaining prevention portion
C coin (disk)

The invention claimed is:

1. A disk feeding device including:

a base body;

a hopper head that stores a disk;

a rotary disk that is disposed in a circular recess formed on a top surface of the base body and is rotatable;

a feeding passage that is provided in the base body and through which the disk fed toward an outside of the disk feeding device passes; and a guide roller and a feeding member that face each other via the feeding passage, the rotary disk including a circular through hole that penetrates in a rotation axis direction and a push protrusion that pushes the disk in a rotation direction to move the disk, and moving the disk that is sent to the rotary disk from the hopper head and passes through the through hole with the push protrusion in the rotation direction along a circumferential wall of the circular recess, the guide roller guiding the disk moved to a predetermined position of the rotation direction toward the feeding passage, the feeding member being capable of reciprocating in a direction in which a distance from the guide roller is changed, and feeding the disk pinched between the feeding member and the guide roller by a biasing force of a biasing member while being biased toward the guide roller by the biasing member, wherein the feeding member includes a swing body that is configured to be able to swing within a predetermined swing range and is biased toward the guide roller by the biasing member, a guide pin that is fixed to the swing body and guides the disk moved in the rotation direction by the rotary disk towards the guide roller, and a feeding roller that is fixed to the swing body and pinches the disk guided by the guide pin between the guide roller and itself and feeds the disk towards the feeding passage, and the disk feeding device comprising:

a holder that includes a frame body defining the swing range of the swing body and holds the biasing member, thereby reciprocally holds the feeding member and is separated from the base body; and a lock for changing a locking position of the holder with respect to the base body along a track in a direction in which the distance is changed.

2. The disk feeding device according to claim 1, wherein a first tooth row including a plurality of teeth arranged at a predetermined interval along the track is provided in the base body, a second tooth row that includes a plurality of teeth and meshes with the first tooth row is provided in the holder, and the holder is configured to be capable of being attached to and detached from the base body in a tooth width direction of the first tooth row.

3. The disk feeding device according to claim 1, wherein a tooth row including a plurality of teeth arranged at a predetermined interval along the track is provided in the base body, a gear meshing with the tooth row is provided on the holder, and the lock includes at least the tooth row and the gear.

4. The disk feeding device according to claim 2, wherein a scale is provided on the first tooth row.

5. The disk feeding device according to claim 1, wherein a detection sensor that detects the disk in the feeding passage, a width adjustment pin that adjusts a width of the feeding passage, and a plurality of recesses into which the width adjustment pin is inserted are provided in the feeding passage.

6. The disk feeding device according to claim 1, wherein a remaining prevention protrusion that prevents the disk from remaining on an edge of the rotary disk in a radial direction is detachably provided in the hopper head.

7. The disk feeding device according to claim 3, wherein a scale is provided on the tooth row.

* * * * *